(12) United States Patent
Kaga et al.

(10) Patent No.: US 11,380,459 B2
(45) Date of Patent: Jul. 5, 2022

(54) INSULATED WIRE

(71) Applicant: Hitachi Metals, Ltd., Tokyo (JP)

(72) Inventors: Masafumi Kaga, Hitachi (JP);
Tamotsu Kibe, Hitachi (JP); Yoshiaki Nakamura, Hitachi (JP); Motoharu Kajiyama, Takahagi (JP)

(73) Assignee: HITACHI METALS, LTD., Tokyo (JP)

( * ) Notice: Subject to any disclaimer, the term of this patent is extended or adjusted under 35 U.S.C. 154(b) by 248 days.

(21) Appl. No.: 15/621,715

(22) Filed: Jun. 13, 2017

(65) Prior Publication Data
US 2017/0365378 A1 Dec. 21, 2017

(30) Foreign Application Priority Data

Jun. 17, 2016 (JP) .............................. JP2016-120692
Oct. 28, 2016 (JP) .............................. JP2016-211634
(Continued)

(51) Int. Cl.
*H01B 7/295* (2006.01)
*H01B 7/282* (2006.01)
(Continued)

(52) U.S. Cl.
CPC ............. *H01B 7/295* (2013.01); *C08G 73/10* (2013.01); *C08G 73/1046* (2013.01);
(Continued)

(58) Field of Classification Search
CPC . C08G 73/10; C08G 73/1046; C08L 2201/02; C08L 2203/202; C08L 23/0853;
(Continued)

(56) References Cited

U.S. PATENT DOCUMENTS 5,912,436 A 6/1999 Sanchez et al.
6,455,769 B1 * 9/2002 Belli ...................... H01B 7/288
174/23 C
(Continued)

FOREIGN PATENT DOCUMENTS

JP S52-113389 U 2/1977
JP S52-113389 U 8/1977
(Continued)

OTHER PUBLICATIONS

Extended European Search Report dated Dec. 1, 2017 in European Application No. 17175787.5.
(Continued)

*Primary Examiner* — Holly Rickman
*Assistant Examiner* — Linda N Chau
(74) *Attorney, Agent, or Firm* — McGinn IP Law Group, PLLC

(57) ABSTRACT

An insulated wire includes a conductor, and a flame-retardant insulation layer that includes a resin composition including a flame retardant and is arranged around the conductor, and a water-blocking layer that is arranged around the flame-retardant insulation layer and has a water absorption of not more than 0.5% at saturation. The thickness of the water-blocking layer is not less than 25 μm.

19 Claims, 6 Drawing Sheets

(30) Foreign Application Priority Data

Nov. 10, 2016 (JP) .............................. JP2016-219791
Mar. 31, 2017 (JP) .............................. JP2017-071029

(51) Int. Cl.
  *H01B 7/29* (2006.01)
  *C08G 73/10* (2006.01)
  *C08L 23/08* (2006.01)
  *H01B 3/44* (2006.01)

(52) U.S. Cl.
  CPC .......... *C08L 23/0853* (2013.01); *H01B 3/441* (2013.01); *H01B 7/282* (2013.01); *H01B 7/2825* (2013.01); *H01B 7/292* (2013.01); *C08L 2201/02* (2013.01); *C08L 2203/202* (2013.01); *Y02A 30/14* (2018.01)

(58) Field of Classification Search
  CPC ...... H01B 3/441; H01B 7/282; H01B 7/2825; H01B 7/292; H01B 7/295; Y02A 30/14
  See application file for complete search history.

(56) References Cited

U.S. PATENT DOCUMENTS

| | | | |
|---|---|---|---|
| 7,586,043 | B2 | 9/2009 | Sato |
| 8,206,825 | B2* | 6/2012 | Appel .................. C08L 23/08 174/110 PM |
| 8,212,148 | B1* | 7/2012 | Lenges ............... C08L 23/0853 174/110 R |
| 2009/0057009 | A1 | 3/2009 | Sato |
| 2009/0255708 | A1* | 10/2009 | Sato ...................... C08L 67/02 174/110 SR |
| 2010/0116548 | A1 | 5/2010 | Nonaka |
| 2013/0228358 | A1 | 9/2013 | Fujimoto et al. |
| 2014/0102752 | A1 | 4/2014 | Ushiwata et al. |
| 2015/0093529 | A1* | 4/2015 | Fujita .................... H01B 3/441 428/36.9 |

FOREIGN PATENT DOCUMENTS

| | | |
|---|---|---|
| JP | S61-253719 | 11/1986 |
| JP | H4-126621 U | 11/1992 |
| JP | H 6-44820 A | 2/1994 |
| JP | 2002-093247 A | 3/2002 |
| JP | 2006-310093 A | 11/2006 |
| JP | 2008-277142 A | 11/2008 |
| JP | 2013-187131 A | 9/2013 |
| JP | 2013-214487 A | 10/2013 |
| JP | 2014-082083 A | 5/2014 |
| JP | 2015-220084 A | 12/2015 |
| WO | WO 2013/030795 A1 | 3/2013 |

OTHER PUBLICATIONS

Japanese Office Action dated Mar. 6, 2018 in corresponding Japanese Application No. 2016-211634 with an English translation thereof.
European Office Action, dated Aug. 13, 2019, in European Application No. 17 175 787.5.
Chinese Office Action, dated Jun. 28, 2019, in Chinese Application No. 201710447138.X and English Translation thereof.
Chinese Office Action, dated Mar. 5, 2020, in Chinese Application No. 201710447138.X and English Translation thereof.
Chinese Office Action, dated Jun. 3, 2020, in Chinese Patent Application No. 201710447138.X and English Translation thereof.
Japanese Office Action, dated Aug. 27, 2020, in Japanese Application No. 2017-071029 and English Translation thereof.
Notification of Reexamination, dated Jan. 28, 2021, in Chinese Application No. 201710447138.X and English Translation thereof.
"High-performance cable Materials and Their Applications", Zhang Shu Hua, et al., published by Shanghai Jiao Tong University Press, Nov. 2015, pp. 147 to 149 and its English Translation.
Decision of Reexamination, dated Jun. 2, 2021, in Chinese Application No. 201710447138X and English Translation thereof.
Japanese Decision of Refusal, dated Mar. 18, 2021, in Japanese Application No. 2017-071029 and English Translation thereof.

* cited by examiner

Prior Art

Prior Art

Prior Art

INSULATED WIRE

BACKGROUND OF THE INVENTION

1. Field of the Invention

The invention relates to an insulated wire.

2. Description of the Related Art

Insulated wires used for wiring in rolling stocks or vehicles, etc., are required to have not only insulating properties but also flame retardancy so as not to be burnt easily in the event of fire. Thus, a flame retardant is mixed to cover layers of the insulated wires. For example, JP-A-2013-214487 discloses an insulated wire in which a cover layer is formed by laminating a flame-retardant layer containing a flame retardant on the outer surface of an insulation layer. According to JP-A-2013-214487, an insulated wire having well-balanced high insulating properties and high flame retardancy is obtained by laminating the flame-retardant layer on the outer surface of the insulation layer.

SUMMARY OF THE INVENTION

In recent years, insulated wires are required to have a smaller outer diameter in view of weight reduction. To meet such requirement, it is suggested to reduce the thickness of the inner insulation layer or the outer flame-retardant layer.

However, when the thickness of the flame-retardant layer is reduced, it is difficult to maintain high flame retardancy. On the other hand, when the thickness of the insulation layer is reduced, insulation reliability decreases and it is difficult to maintain high DC stability. In other words, it is difficult to provide an insulated wire having a reduced outer diameter while achieving both high flame retardancy and high DC stability.

Also, since the cover layer is likely to deteriorate due to oxidation or metal-induced degradation (the catalytic effect of metal ions) in a high-temperature environment, improvement in heat resistance is required.

It is an object of the invention to provide an insulated wire that has a reduced outer diameter while satisfying high levels of flame retardancy, DC stability and heat resistance.

According to an embodiment of the invention, an insulated wire comprises:

a conductor; and a flame-retardant insulation layer that comprises a resin composition comprising a flame retardant and is arranged around the conductor; and a water-blocking layer that is arranged around the flame-retardant insulation layer and has a water absorption of not more than 0.5% at saturation, wherein the thickness of the water-blocking layer is not less than 25 μm.

Effects of the Invention

According to an embodiment of the invention, an insulated wire can be provided that has a reduced outer diameter while satisfying high levels of flame retardancy, DC stability and heat resistance.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

First Embodiment

Figure 2:
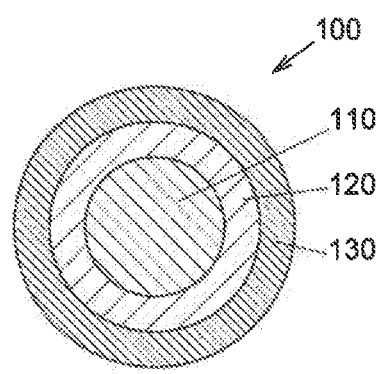
FIG. 2 is a cross sectional view showing a conventional insulated wire taken perpendicular to the longitudinal direction thereof.

Firstly, a conventional insulated wire will be described in reference to FIG. 2. FIG. 2 is a cross sectional view showing a conventional insulated wire taken perpendicular to the longitudinal direction thereof.

As shown in FIG. 2, a conventional insulated wire 100 is provided with a conductor 110, an insulation layer 120 arranged around the conductor 110, and a flame-retardant layer 130 arranged around the insulation layer 120 and containing a flame retardant.

In the conventional insulated wire 100, the flame-retardant layer 130 is formed of a resin in the same manner as the insulation layer 120 and thus exhibits certain insulating properties, but tends to have low insulation reliability and low DC stability. As described later, DC stability is one of the electrical characteristics evaluated by the DC stability test in accordance with EN 50305.6.7 and is a measure of insulation reliability which indicates that insulation breakdown does not occur in the insulated wire 100 even after the lapse of a predetermined period of time under application of predetermined voltage in water.

As a result of study by the inventors, it was found that low DC stability of the flame-retardant layer 130 is caused by an increase in water absorption due to mixing a flame retardant. One of possible reasons is that the hydroxyl group of the flame retardant increases water absorption, but it is also considered that, for example, microscopic spaces are formed around the flame retardant in the flame-retardant layer 130 due to low adhesion between the resin constituting the flame-retardant layer 130 and the flame retardant, and these spaces allow water to penetrate the flame-retardant layer 130 which is thereby likely to absorb water. In such flame-retardant layer 130, a conductive path is formed due to water penetration and insulation breakdown is likely to occur when the insulated wire 100 is immersed in water for evaluation of DC stability, hence, low insulation reliability. As such, insulating properties of the flame-retardant layer 130 tends to decrease due to water absorption, causing a decrease in DC stability.

On the other hand, since the insulation layer 120 is covered with the flame-retardant layer 130, a flame retardant is not mixed in the insulation layer 120, or even in case of mixing the flame retardant, the mixed amount is small. Therefore, the insulation layer 120 does not exhibit flame retardancy unlike the flame-retardant layer 130, but is formed to exhibit low water absorption and contributes to DC stability.

As such, in the conventional insulated wire 100, the insulation layer 120 contributes to DC stability and the flame-retardant layer 130 contributes to flame retardancy. This means that both the insulation layer 120 and the flame-retardant layer 130 need to be thick to achieve both high levels of DC stability and flame retardancy, and none of these layers can be easily thinned even for reducing a diameter of the insulated wire 100.

The present inventors considered that since the conventional insulated wire 100 has the water-absorbent flame-retardant layer 130 on the surface and this causes a decrease in DC stability (insulation reliability), the flame-retardant layer 130 can contribute to DC stability in addition to flame retardancy by preventing water penetration through the flame-retardant layer 130, which leads to thickness reduction of the insulation layer 120 and eventually reduction of an outer diameter of the insulated wire 100.

Then, a method of preventing water penetration through the flame-retardant layer 130 was studied. As a result, it was found that a water-blocking layer with low water absorption should be provided around a flame-retardant layer. In this case, since water penetration through the flame-retardant layer can be prevented by the water-blocking layer, the flame-retardant layer can function as a flame-retardant insulation layer which has not only flame retardancy but also DC stability. As a result, it is possible to eliminate the conventionally-formed insulation layer 120. In other words, the conventional laminated structure composed of the insulation layer 120 and the flame-retardant layer 130 can be replaced with a laminated structure composed of the flame-retardant insulation layer and the water-blocking layer. Since the water-blocking layer only needs to have a thickness capable of preventing water penetration and does not need to be as thick as the conventional insulation layer 120, it is possible to reduce an outer diameter of the insulated wire by using the water-blocking layer.

The present invention was made based on the above-described findings.

Configuration of Insulated Wire

Figure 1:
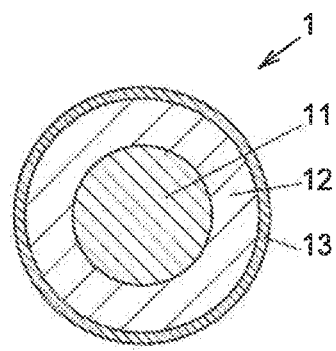
FIG. 1 is a cross sectional view showing an insulated wire in the first embodiment of the present invention taken perpendicular to the longitudinal direction thereof.

An insulated wire in the first embodiment of the invention will be described blow in reference to the drawings. FIG. 1 is a cross sectional view showing an insulated wire in the first embodiment of the invention taken perpendicular to the longitudinal direction thereof. Hereinafter, each of the numerical ranges expressed using "-" includes the numerical values before and after "-" as the lower and upper limits.

As shown in FIG. 1, an insulated wire 1 in the first embodiment is provided with a conductor 11, a flame-retardant insulation layer 12 and a water-blocking layer 13.

Conductor 11

As the conductor 11, it is possible to use a commonly-used metal wire, e.g., a copper wire, a copper alloy wire, an aluminum wire, a gold wire or a silver wire, etc. Alternatively, a metal wire of which outer surface is plated with a metal such as tin or nickel may be used. It is also possible to use a bunch-stranded conductor formed by twisting metal strands. The outer diameter of the conductor 11 can be appropriately changed according to the electrical characteristics required for the insulated wire 1, and is e.g., 1.0 mm-than 20.0 mm.

Flame-Retardant Insulation Layer

The flame-retardant insulation layer 12 is provided around the conductor 11. The flame-retardant insulation layer 12 is formed by, e.g., extruding a resin composition containing a flame retardant on the outer surface of the conductor 11. The flame-retardant insulation layer 12 containing a flame retardant contributes to flame retardancy of the insulated wire 1. Since the water-blocking layer 13 (described later) covering the flame-retardant insulation layer 12 prevents water ingress when the insulated wire 1 is immersed in water for evaluation of DC stability, the flame-retardant insulation layer 12 can have high insulation reliability and also contributes to DC stability of the insulated wire 1.

The thickness of the flame-retardant insulation layer 12 can be appropriately changed according to flame retardancy and DC stability which are required for the insulated wire 1, and the thicker flame-retardant insulation layer 12 can maintain higher levels of flame retardancy and DC stability. In detail, the thickness of the flame-retardant insulation layer 12 is preferably not less than 0.2 mm. When the flame-retardant insulation layer 12 is not less than 0.2 mm in thickness, it is possible to achieve both high flame retardancy in compliance with EN 60332-1-2 and high DC stability in compliance with EN 50305.6.7. The upper limit of the thickness of the flame-retardant insulation layer 12 is not specifically limited but is preferably not more than 0.5 mm to reduce a diameter of the insulated wire 1. By using the flame-retardant insulation layer 12 having such thickness, it is possible to obtain high flame retardancy as well as high DC stability while reducing a diameter of the insulated wire 1.

A resin composition constituting the flame-retardant insulation layer 12 contains a resin and a flame retardant.

The type of the resin constituting the flame-retardant insulation layer 12 is appropriately changed according to the characteristics, e.g., mechanical characteristics (elongation and strength, etc.), flame retardancy and DC stability, required for the insulated wire 1. It is possible to use, e.g., a polyolefin resin and a polyamide-imide resin (PAI resin), etc. The polyolefin resin used here can be a polyethylene-based resin or a polypropylene-based resin, etc., and it is particularly preferable to use the polyethylene-based resin. Examples of the polyethylene-based resin used here include low-density polyethylene (LDPE), linear low-density polyethylene (LLDPE), high-density polyethylene (HDPE), ethylene-vinyl acetate copolymer (EVA), ethylene-ethyl acrylate copolymer, ethylene-methyl acrylate copolymer and ethylene-glycidyl methacrylate copolymer, etc. These polyolefin-based resins may be used alone or in combination of two or more.

For the flame-retardant insulation layer 12, HDPE is particularly preferable to obtain higher DC stability, and it is possible to use, e.g., HDPE having a density of not less than 0.95 g/cm$^3$ and not more than 0.98 g/cm$^3$. Meanwhile, EVA is particularly preferable to obtain higher flame retardancy, and it is possible to use, e.g., EVA with a higher vinyl acetate content.

The flame retardant is preferably a halogen-free flame retardant since it does not produce toxic gas, and for example, a metal hydroxide can be used. The metal hydroxide is decomposed and dehydrated when the flame-retardant insulation layer 12 is heated and burnt and the released water lowers the temperature of the flame-retardant insulation layer 12 and suppresses combustion thereof. As the metal hydroxide, it is possible to use, e.g., magnesium hydroxide, aluminum hydroxide, calcium hydroxide and these metal hydroxides with dissolved nickel. These flame retardants may be used alone or in a combination of two or more.

The flame retardant is preferably surface-treated with, e.g., a silane coupling agent, a titanate-based coupling agent, fatty acid such as stearic acid, fatty acid salt such as stearate, or fatty acid metal such as calcium stearate to control mechanical characteristics (a balance between tensile strength and elongation) of the flame-retardant insulation layer 12.

In view of flame retardancy, the amount of the flame retardant to be mixed is preferably, e.g., 50 parts by mass-300 parts by mass with respect to 100 parts by mass of the resin. When the mixed amount is less than 50 parts by mass, the insulated wire 1 may not be able to have desired high flame retardancy. When the mixed amount is more than 300 parts by mass, mechanical characteristics of the flame-retardant insulation layer 12 may decrease, resulting in a decrease in elongation percentage.

The resin composition constituting the flame-retardant insulation layer 12 may contain other additives, if required. For example, in case that the flame-retardant insulation layer 12 is cross-linked, a cross-linking agent or a cross-linking aid may be mixed. In addition to the cross-linking agent, it is also possible to mix, e.g., a flame-retardant aid, an antioxidant, a lubricant, a softener, a plasticizer, an inorganic filler, a compatibilizing agent, a stabilizer, carbon black and a colorant, etc. These additives can be contained as long as the characteristics of the flame-retardant insulation layer 12 are not impaired.

Water-Blocking Layer

The water-blocking layer 13 is provided around the flame-retardant insulation layer 12. The water-blocking layer 13 has a water absorption of not more than 0.5% at saturation and is configured to have a small water absorption rate or a small water diffusion coefficient. The water-blocking layer 13, which has high water-blocking properties and is hard for water to penetrate, can prevent water ingress to the flame-retardant insulation layer 12. The lower limit of the water absorption at saturation is not specifically limited and may be 0%. The term "water absorption at saturation" as used herein means water saturation derived by Fick's law in accordance with JIS K 7209:2000.

The thickness of the water-blocking layer 13 is not less than 25 μm to ensure water-blocking properties. If it has a thickness of not less than 25 μm, the water-blocking layer 13 can have higher strength so as to prevent from being broken even when the insulated wire 1 is bent. As a result, it is possible to maintain water-blocking properties of the water-blocking layer 13, and DC stability and flame retardancy of the flame-retardant insulation layer 12 can be achieved at high levels. Here, the upper limit of the thickness of the water-blocking layer 13 is not specifically limited, but is preferably not more than 100 μm to reduce an outer diameter of the insulated wire 1. The water-blocking layer 13 does not contain a flame retardant and thus may cause a decrease in flame retardancy of the insulated wire 1. However, when the thickness of the water-blocking layer 13 is not more than 100 μm, flame retardancy of the insulated wire 1 is not impaired and can be maintained at high level.

Meanwhile, a ratio of the thickness of the water-blocking layer 13 to the combined thickness of the water-blocking layer 13 and the flame-retardant insulation layer 12 in the insulated wire 1 is preferably not more than 18%, more preferably 5%-12%, to achieve both high flame retardancy and high DC stability. The water-blocking layer 13 does not contain a flame retardant and thus may cause a decrease in flame retardancy of the entire insulated wire 1 as described above, but when the thickness ratio with respect to the flame-retardant insulation layer 12 having flame retardancy is within the above-mentioned range, the insulated wire 1 can have both high flame retardancy and high DC stability.

The water-blocking layer 13 is preferably formed seamlessly having no seams, e.g., formed in a cylindrical shape, to ensure water-blocking properties. The material used to form the water-blocking layer 13 is not specifically limited as long as the water absorption at saturation is small and the water-blocking layer 13 having no seams can be formed. A resin is preferable as such material in view of molding processability of the water-blocking layer 13. Such resin is preferably a halogen-free polyolefin resin in view of safety, and is preferably a resin having a density of 0.85 g/cm$^3$-1.20 g/cm$^3$ to obtain water-blocking properties and mechanical characteristics. It is possible to use, e.g., high-density polyethylene (HDPE) or low-density polyethylene (LDPE). Alternatively, a fluorine-containing resin (e.g., PFA), etc., may be used since the water absorption is small.

When the water-blocking layer 13 is formed of a resin, it is preferable to cross-link the resin to further improve water-blocking properties. In other words, the water-blocking layer 13 is preferably formed of a cross-linked body obtained by cross-linking a resin. The resin can have a stronger molecular structure when cross-linked and it is thereby possible to improve water-blocking properties of the water-blocking layer 13. In addition, since this also improves strength of the water-blocking layer 13, high water-blocking properties can be maintained without impairing strength even if the thickness of the water-blocking layer 13 is reduced.

Preferably, the cross-linked body constituting the water-blocking layer 13 is cross-linked so as to have a gel fraction of 40%-100%. When the gel fraction of the cross-linked body is higher, the water-blocking layer 13 can have higher strength and higher water-blocking properties and thus can be reduced in thickness. By cross-linking the water-blocking layer 13 so as to have such gel fraction, it is possible to maintain high strength of the water-blocking layer 13 while reducing the thickness thereof, and also desired high water-blocking properties can be obtained by having the water absorption of not more than 0.5% at saturation.

When the water-blocking layer 13 is formed of a resin such as HDPE, a resin composition containing HDPE is extruded on the outer surface of the flame-retardant insulation layer 12. When cross-linking is performed, a cross-linking agent or a cross-linking aid is mixed to the resin composition. Cross-linking can be performed by a known method such as chemical cross-linking or electron beam cross-linking.

In addition to the cross-linking agent or the cross-linking aid, the resin composition constituting the water-blocking layer 13 may also contain a flame-retardant aid, an antioxidant, a lubricant, a softener, a plasticizer, an inorganic filler, a compatibilizing agent, a stabilizer, carbon black and a colorant, etc. These additives can be contained as long as the characteristics of the water-blocking layer 13 are not impaired.

Flame-Retardant Layer

Figure 3:
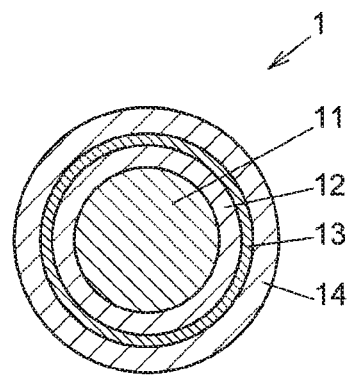
FIG. 3 is a cross sectional view showing an insulated wire in another embodiment of the invention taken perpendicular to the longitudinal direction thereof.

FIG. 3 is a cross sectional view showing an insulated wire in another embodiment of the invention taken perpendicular to the longitudinal direction thereof. This embodiment is the same as the first embodiment of the invention, except that a flame-retardant layer 14 is provided around the water-blocking layer 13 as shown in FIG. 3. It is possible to further improve flame retardancy by providing the flame-retardant layer 14. The flame-retardant layer is preferably formed of a resin composition containing a flame retardant. The resin composition described above for the flame-retardant insulation layer can be also used to form the flame-retardant layer in the same manner.

Effects of the First Embodiment

In the first embodiment, one or several effects described below are obtained.

In the first embodiment, a resin layer containing a flame retardant is provided around the conductor 11 to obtain flame retardancy, and furthermore, the water-blocking layer 13 formed of a resin such as HDPE or LDPE and having a small water absorption at saturation is provided on the resin layer. Since this prevents water ingress to the resin layer when the insulated wire 1 is immersed in water for evaluation of DC stability, the resin layer containing a flame retardant can functions as the flame-retardant insulation layer 12 which can contribute to not only flame retardancy but also DC stability. As a result, it is possible to maintain desired DC stability without forming the insulation layer 120 contributing DC stability which is formed in the conventional insulated wire 100 shown in FIG. 2. Unlike the insulation layer 120 which needs to be formed thick to obtain desired DC stability, the water-blocking layer 13 can be thin to the extent that water-blocking properties are obtained. Thus, by forming the water-blocking layer 13 instead of the insulation layer 120, the outer diameter of the insulated wire 1 can be reduced by the thickness difference. As such, in the first embodiment, the insulated wire 1 can have a reduced outer diameter while achieving both high flame retardancy and high DC stability.

To form the conventional insulated wire 100 as shown in FIG. 2 so as to achieve, e.g., both high flame retardancy in compliance with EN 60332-1-2 and high DC stability in compliance with EN 50305.6.7, the insulation layer 120 needs to have a thickness of 0.6 mm-2.0 mm and the flame-retardant layer 130 containing a flame retardant needs to have a thickness of 0.2 mm-2.1 mm when using the conductor 110 with an outer diameter of 1.0 mm-20.0 mm, resulting in that the insulated wire 100 has an outer diameter of 2.4 mm-32.9 mm.

On the other hand, in the first embodiment, the thickness of the flame-retardant insulation layer 12 can be 0.20 mm-0.5 mm and the thickness of the water-blocking layer 13 can be 0.025 mm-0.1 mm even when the conductor 11 has the same outer diameter, and the outer diameter of the insulated wire 1 can be reduced to the range of 1.45 mm-21.2 mm.

The water-blocking layer 13 is preferably formed of a resin, which is preferably a polyolefin resin having a density of 0.85 g/cm$^3$-1.20 g/cm$^3$. When using such polyolefin resin, it is easy to form the water-blocking layer 13 by extrusion molding. Particularly HDPE, which has a high density and is hard for water to penetrate, can increase water-blocking properties of the water-blocking layer 13. Meanwhile, in case of using LDPE, it is possible to increase the degree of cross-linking and water-blocking properties of the water-blocking layer 13 thus can be increased.

It is preferable that the water-blocking layer 13 be formed of a cross-linked body which is obtained by cross-linking HDPE and has a gel fraction of 40%-100%. When the gel fraction is in such range, strength and water-blocking properties of the water-blocking layer 13 are increased and the thickness of the water-blocking layer 13 thus can be reduced. As a result, the outer diameter of the insulated wire 1 can be further reduced.

In the first embodiment, the insulated wire 1 may not be reduced in diameter and may have the same diameter as the conventional wires. In this case, it is possible to further increase flame retardancy and DC stability by increasing the thickness of the flame-retardant insulation layer 12.

Other Embodiments of the Invention

Although the first embodiment of the invention has been specifically described, the invention is not limited to the above-mentioned embodiment and can be appropriately changed without departing from the gist of the invention.

Although the water-blocking layer 13 in the first embodiment is formed of a resin such as HDPE, the invention is not limited thereto. The water-blocking layer 13 may be formed of a material other than resin, and may be formed of, e.g., a metal, a ceramic or glass, etc.

When the water-blocking layer 13 is formed of a metal, the water-blocking layer 13 can be formed by, e.g., winding a metal foil of copper or aluminum, etc., around the flame-retardant insulation layer 12.

When the water-blocking layer 13 is formed of a ceramic or glass, the water-blocking layer 13 can be formed by, e.g., treating the outer surface of the flame-retardant insulation layer 12 with alumina, zirconia or diamond-like carbon (DLC) using the plasma CVD method.

In addition, although FIG. 1 shows an example in which the water-blocking layer 13 is laminated on the flame-retardant insulation layer 12, the invention is not limited thereto. For example, an adhesive layer may be provided between the flame-retardant insulation layer 12 and the water-blocking layer 13 to improve adhesion therebetween. Also, another functional layer, e.g., a flame-retardant layer containing a flame retardant and having flame retardancy, may be provided around the water-blocking layer 13.

EXAMPLES

The invention will be described in more detail below in reference to Examples. However, the invention is not limited thereto.

The following materials were used in Examples and Comparative Examples.

Ethylene-vinyl acetate copolymer (EVA1): "Evaflex EV260", VA content: 28%, MFR: 6, manufactured by Du Pont-Mitsui Polychemical Ethylene-vinyl acetate copolymer (EVA2): "Evaflex 45X", VA content: 46%, MFR: 100, manufactured by Du Pont-Mitsui Polychemical Maleic acid-modified polymer: "TAFMER MH7020", manufactured by Mitsui Chemicals High-density polyethylene (HDPE, d: 0.951 g/cm$^3$, MFR: 0.8): "HI-ZEX 5305E", manufactured by Prime Polymer Low-density polyethylene (LDPE, d: 0.921 g/cm$^3$, MFR: 1): "UBE C450", manufactured by Ube Industries Magnesium hydroxide (silane-treated): "H10A", manufactured by Albemarle Magnesium hydroxide (fatty acid-treated): "H10C", manufactured by Albemarle Blended antioxidant: "AO-18", manufactured by ADEKA Phenolic antioxidant: "Irganox 1010", manufactured by BASF Colorant: "FT carbon", manufactured by Asahi Carbon Lubricant (Zinc stearate): manufactured by Nittoh Chemical Manufacturing of Insulated Wire

Example 1

Firstly, using the above-listed materials, a resin composition A for forming flame-retardant insulation layer was prepared.

In detail, the resin composition A was prepared by mixing and kneading 70 parts by mass of EVA1, 15 parts by mass of EVA2, 15 parts by mass of maleic acid-modified polymer, 80 parts by mass of silane-treated magnesium hydroxide, 120 parts by mass of fatty acid-treated magnesium hydroxide, 1 part by mass of blended antioxidant, 2 parts by mass of colorant and 1 part by mass of lubricant.

Subsequently, a resin composition B for forming water-blocking layer was prepared.

In detail, the resin composition B was prepared by mixing and kneading 100 parts by mass of HDPE and 1 part by mass of phenolic antioxidant.

Then, an insulated wire was formed using the prepared resin compositions A and B.

In detail, the resin composition A was extruded on an outer surface of a 1.23 mm-diameter twisted copper wire formed by twisting plural copper strands together, and a 0.3 mm-thick flame-retardant insulation layer was thereby formed. Subsequently, the resin composition B was extruded on an outer surface of the flame-retardant insulation layer and was then cross-linked by exposure to an electron beam, and a 0.05 mm (50 μm)-thick water-blocking layer was thereby formed. An insulated wire having an outer diameter of 1.93 mm was thereby obtained. The water-blocking layer had such a degree of cross-linking that the gel fraction was 41.2%, and the water absorption at saturation was 0.4%. The configuration of the insulated wire in Example 1 is summarized in Table 1.

Example 2

An insulated wire in Example 2 was made in the same manner as Example 1, except that the thicknesses of the flame-retardant insulation layer and the water-blocking layer were appropriately changed as shown in Table 1 so that the wire outer diameter was smaller than that in Example 1.

Example 3

An insulated wire in Example 3 was made in the same manner as Example 1, except that the resin composition B for forming water-blocking layer was prepared using LDPE instead of HDPE.

Example 4

An insulated wire in Example 4 was made in the same manner as Example 1, except that the thicknesses of the flame-retardant insulation layer and the water-blocking layer were appropriately changed as shown in Table 1 so that the wire outer diameter was smaller than that in Example 3.

Comparative Example 1

An insulated wire in Comparative Example 1 was made in the same manner as Example 1, except that the water-blocking layer had a thickness of 0.01 mm (10 μm) as shown in Table 1.

Comparative Example 2

An insulated wire in Comparative Example 2 was made in the same manner as Example 1, except that the water-blocking layer had a thickness of 0.005 mm (5 μm) as shown in Table 1.

Comparative Example 3

In Comparative Example 3, an insulated wire having a structure shown in FIG. 2 was made.

In detail, firstly, a resin composition for forming insulation layer was prepared by mixing and kneading 100 parts by

TABLE 1

| | | | Examples | | | | Comparative Examples | |
|---|---|---|---|---|---|---|---|---|
| | | | 1 | 2 | 3 | 4 | 1 | 2 |
| Wire outer diameter [mm] | | | 1.93 | 1.86 | 1.93 | 1.86 | 2.05 | 2.04 |
| Insulated wire | Conductor | Diameter [mm] | 1.23 | 1.23 | 1.23 | 1.23 | 1.23 | 1.23 |
| | Flame-retardant insulation layer | Thickness [mm] | 0.3 | 0.28 | 0.3 | 0.28 | 0.4 | 0.40 |
| | Water-blocking layer | Thickness [mm] | 0.05 | 0.035 | 0.05 | 0.035 | 0.01 | 0.005 |
| | | Gel fraction [%] | 41.2 | 42.1 | 48.1 | 47.5 | 45.6 | 42.9 |
| | | Water absorption at saturation [%] | 0.4 | 0.4 | 0.4 | 0.4 | 0.4 | 0.4 |
| Evaluation | DC stability (time to insulation breakdown [h]) | | 42 | 31 | 45 | 40 | 12 | Not more than 2 |
| | Flame retardancy | VFT | ⊚ | ⊚ | ⊚ | ⊚ | ○ | ⊚ |
| | | VTFT | ⊚ | ○ | ⊚ | ○ | ○ | ⊚ | mass of LDPE, 100 parts by mass of clay, 7 parts by mass of cross-linking aid and 1.5 parts by mass of phenolic antioxidant. A resin composition for forming flame-retardant layer was also prepared by mixing and kneading 100 parts by mass of EVA1 and 200 parts by mass of magnesium hydroxide. Next, the same twisted copper wire as that in Example 1 was prepared and a 0.3 mm-thick insulation layer was formed thereon by extruding the resin composition for forming insulation layer. Then, the resin composition for forming flame-retardant layer was extruded on the outer surface of the insulation layer and was then cross-linked by exposure to an electron beam, thereby forming a 0.4 mm-thick flame-retardant layer. As a result, an insulated wire having an outer diameter of 2.62 mm was obtained. The flame-retardant layer located on the surface of the insulated wire had such a degree of cross-linking that the gel fraction was 82.3%, but the water absorption at saturation was 5%. The formation conditions in Comparative Example 3 are summarized in Table 2 below.

TABLE 2

|  |  |  | Comparative Examples | | | |
|---|---|---|---|---|---|---|
|  |  |  | 3 | 4 | 5 | 6 |
| Wire outer diameter [mm] | | | 2.62 | 1.93 | 2.03 | 1.95 |
| Insu- | Conductor | Diameter [mm] | 1.23 | 1.23 | 1.23 | 1.23 |
| lated | Insulation layer | Thickness [mm] | 0.3 | 0.25 | 0.1 | 0 |
| wire | Flame-retardant | Thickness [mm] | 0.4 | 0.1 | 0.3 | 0.36 |
|  | layer | Gel fraction [%] | 82.3 | 84.1 | 80.2 | 82.2 |
|  |  | Water absorption at saturation [%] | 5 | 5 | 5 | 5 |
| Evalua- | DC stability (time to insulation breakdown [h]) | | Not less than 240 | Not less than 240 | 25 | Not more than 2 |
| tion | Flame | VFT | ⊚ | X | ○ | ⊚ |
|  | retardancy | VTFT | ⊚ | X | ○ | ⊚ |

Comparative Examples 4 and 5

Insulated wires in Comparative Examples 4 and 5 were made in the same manner as Comparative Example 3, except that the thicknesses of the insulation layer and the flame-retardant layer were changed as shown in Table 2.

Comparative Example 6

An insulated wire in Comparative Example 6 was made in the same manner as Comparative Example 3, except that the insulation layer was not formed and the flame-retardant layer was formed directly on the conductor.

Evaluation Method

The obtained insulated wires were evaluated by the following methods. The evaluation results are summarized in Table 2.

DC Stability

DC stability of the insulated wires was evaluated by conducting the DC stability test in accordance with EN 50305.6.7. In detail, voltage was applied to the insulated wires immersed in 3% salt water at 85° C., and time to insulation breakdown was measured. In these Examples, DC stability was evaluated as high when time to insulation breakdown was not less than 30 hours, and evaluated as low when less than 30 hours.

Flame Retardancy

Flame retardancy of the insulated wires was evaluated by the following vertical flame tests.

Firstly, the vertical flame test (VFT) was conducted in accordance with the Test for vertical flame propagation for a single insulated wire or cable specified by EN 60332-1-2. In detail, 600 mm-long insulated wires were held vertical and a flame was applied thereto for 60 seconds. The wires passed the test (⊚: excellent) when the fire was extinguished within 30 seconds after removing the flame, the wires passed the test (○: acceptable) when the fire was extinguished within 60 seconds, and the wires failed the test (×) when the fire was not extinguished within 60 seconds.

Also, the vertical tray flame test (VTFT) was conducted in accordance with the Test for vertical flame spread of vertically mounted bunched wires (Flame propagation in bunched cables) specified by EN 50266-2-4. In detail, seven 3.5-meter insulated wires were twisted into one bundle, and eleven bundles were vertically arranged at equal intervals and were burnt for 20 minutes. Then, a char length from the lower end after self-extinction was measured. In these Examples, the wires with a char length of not more than 1.5 m were regarded as ⊚ (excellent), those with a char length of not more than 2.5 m were regarded as ○ (acceptable), and those with a char length of more than 2.5 m were regarded as × (fail).

Evaluation Results

In Examples 1 to 4, both DC stability and flame retardancy were achieved at high levels while reducing the wire outer diameters, as shown in Table 1. In addition, in Examples, as a result of varying the respective thicknesses of the water-blocking layer and the flame-retardant insulation layer to study the effect of the ratio of the thickness of the water-blocking layer to the combined thickness of the water-blocking layer and the flame-retardant insulation layer, it was confirmed that higher flame retardancy and higher DC stability can be obtained in a well-balanced manner when the ratio is not more than 18%, more preferably 5%-12%.

Meanwhile, in Comparative Examples 1 and 2, the water-blocking layer was provided but had a thickness of less than 25 μm. Thus, the water-blocking layer could not sufficiently prevent water absorption of the flame-retardant insulation layer, resulting in low DC stability.

In Comparative Example 3 in which the insulated wire having a conventional structure was made by laminating the flame-retardant layer on the insulation layer, high flame retardancy and high DC stability were obtained in a well-balanced manner since each layer was formed thick. However, the wire outer diameter was excessively large, e.g., about 35% thicker than that of the insulated wire in Example 1.

In Comparative Examples 4 and 5 in which the insulated wires having the outer diameter equivalent to that in Example 1 were made by reducing the thicknesses of the flame-retardant layer or the insulation layer, flame retardancy and high DC stability could not be achieved at the same time.

Based on the results of Comparative Examples 3 to 5, it was confirmed that when a flame-retardant layer having a high water absorption at saturation is provided on the surface of an insulated wire, the insulation layer located on the inner side of the flame-retardant layer needs to be thick to maintain high DC stability while the flame-retardant layer needs to be thick to maintain high flame retardancy, and it is thus not possible to reduce a diameter of the insulate wire while achieving both of these characteristics.

In Comparative Example 6, since the insulation layer was not formed and only the flame-retardant layer was provided, high flame retardancy was obtained but DC stability was low.

As described above, when the insulated wire has a water-blocking layer with a predetermined thickness around a resin layer containing a flame retardant, it is possible to prevent water ingress to the resin layer located inside and to allow the resin layer containing a flame retardant to function as a flame-retardant insulation layer which contributes to not only flame retardancy but also DC stability. As a result, it is possible to achieve both DC stability and flame retardancy while reducing an outer diameter of the insulated wire.

Preferred Embodiments of the Invention

Preferred embodiments of the invention will be described below.

[1] An aspect of the invention provides an insulated wire comprising:

a conductor; and a flame-retardant insulation layer that comprises a resin composition containing a flame retardant and is arranged around the conductor; and a water-blocking layer that is arranged around the flame-retardant insulation layer and comprises a material having a water absorption of not more than 0.5% at saturation, wherein the thickness of the water-blocking layer is not less than 25 µm.

[2] In the insulated wire defined by [1], preferably, the water-blocking layer comprises at least one of a resin, a metal, a ceramic and glass.

[3] In the insulated wire defined by [1] or [2], preferably, the water-blocking layer comprises a cross-linked body obtained by cross-linking a resin composition comprising a resin, and the cross-linked body has a gel fraction of not less than 40% and not more than 100%.

[4] In the insulated wire defined by [3], preferably, the resin comprises at least one of high-density polyethylene and low-density polyethylene.

[5] In the insulated wire defined by [3] or [4], preferably, the resin has a density of not less than 0.85 g/cm$^3$ and not more than 1.20 g/cm$^3$.

[6] In the insulated wire defined by any one of [1] to [5], preferably, the thickness of the water-blocking layer is not less than 25 µm and not more than 100 µm.

[7] In the insulated wire defined by any one of [1] to [6], preferably, the thickness of the flame-retardant insulation layer is not less than 0.2 mm.

[8] In the insulated wire defined by any one of [1] to [7], preferably, a ratio of the thickness of the water-blocking layer to the combined thickness of the water-blocking layer and the flame-retardant insulation layer is not more than 18%.

[9] In the insulated wire defined by any one of [1] to [8], preferably, the wire outer diameter is not less than 1.45 mm and not more than 21.2 mm.

[10] In the insulated wire defined by any one of [1] to [9], preferably, the outer diameter of the conductor is not less than 1.0 mm and not more than 20.0 mm.

[11] In the insulated wire defined by any one of [1] to [10], preferably, the thickness of the flame-retardant insulation layer is not less than 0.25 mm and not more than 0.5 mm.

[12] In the insulated wire defined by any one of [1] to [11], preferably, flame retardancy is such that fire is extinguished within 60 seconds after removal of flame in the flame retardant test in accordance with EN 60332-1-2, and DC stability is such that insulation breakdown does not occur even after applying voltage in water for 30 hours in accordance with EN 50305.6.7.

[13] In the insulated wire defined by any one of [1] to [12], preferably, a flame-retardant layer formed of a resin composition containing a flame retardant and arranged around the water-blocking layer is further provided.

Second Embodiment

Figure 8:
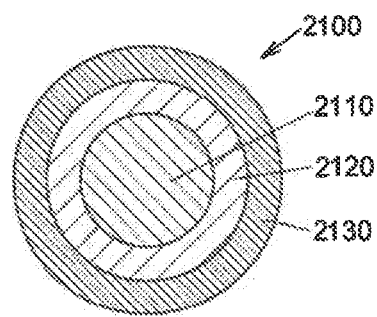
FIG. 8 is a cross sectional view showing a conventional insulated wire taken perpendicular to the longitudinal direction thereof.

Firstly, a conventional insulated wire will be described in reference to FIG. 8. FIG. 8 is a cross sectional view showing a conventional insulated wire taken perpendicular to the longitudinal direction thereof.

As shown in FIG. 8, a conventional insulated wire 2100 is provided with a conductor 2110, an insulation layer 2120 arranged around the conductor 2110, and a flame-retardant layer 2130 arranged around the insulation layer 2120 and containing a flame retardant.

In the conventional insulated wire 2100, the flame-retardant layer 2130 is formed of a resin in the same manner as the insulation layer 2120 and thus exhibits certain insulating properties, but has low insulation reliability and does not really contribute to DC stability. As described later, DC stability is one of the electrical characteristics evaluated by the DC stability test in accordance with EN 50305.6.7 and is a measure of insulation reliability which indicates that insulation breakdown does not occur in the insulated wire 2100 even after the lapse of a predetermined period of time under application of predetermined voltage in water.

As a result of study by the inventors, it was found that reason why the flame-retardant layer 2130 does not contribute to DC stability is that water absorption is increased by mixing a flame retardant. One of the reasons is considered that microscopic spaces are formed around the flame retardant in the flame-retardant layer 2130 due to low adhesion between the resin constituting the flame-retardant layer 2130 and the flame retardant. These spaces allow water to penetrate the flame-retardant layer 2130 which is thereby likely to absorb water. In such flame-retardant layer 2130, a conductive path is formed due to water penetration and insulation breakdown is likely to occur when the insulated wire 2100 is immersed in water for evaluation of DC stability, hence, low insulation reliability. As such, insulating properties of the flame-retardant layer 2130 is likely to decrease due to water absorption, and the flame-retardant layer 2130 thus does not contribute to DC stability.

On the other hand, since the insulation layer 2120 is covered with the flame-retardant layer 2130, it is not necessary to mix a flame retardant to the insulation layer 2120. Therefore, the insulation layer 2120 does not exhibit flame retardancy unlike the flame-retardant layer 2130, but is formed to exhibit low water absorption and contributes to DC stability.

As such, in the conventional insulated wire 2100, the insulation layer 2120 contributes to DC stability and the flame-retardant layer 2130 contributes to flame retardancy. This means that both the insulation layer 2120 and the flame-retardant layer 2130 need to be thick to achieve both high levels of DC stability and flame retardancy, and none of these layers can be easily thinned even for reducing a diameter of the insulated wire 2100.

The present inventors considered that since the conventional insulated wire 2100 has the water-absorbent flame-retardant layer 2130 on the surface and this causes a decrease in DC stability (insulation reliability), the flame-retardant layer 2130 can contribute to DC stability in addition to flame retardancy by preventing water penetration through the flame-retardant layer 2130, which leads to thickness reduction of the insulation layer 2120 and eventually reduction of an outer diameter of the insulated wire 2100.

Then, a method of preventing water penetration through the flame-retardant layer 2130 was studied. As a result, it was found that a water-blocking layer with low water absorption should be provided around a flame-retardant layer. In this case, since water penetration through the flame-retardant layer can be prevented by the water-blocking layer, the flame-retardant layer can function as a resin layer which has not only flame retardancy but also DC stability. As a result, it is possible to eliminate the conventionally-formed insulation layer 2120. In other words, the conventional laminated structure composed of the insulation layer 2120 and the flame-retardant layer 2130 can be replaced with a laminated structure composed of the flame-retardant layer and the water-blocking layer. Since the water-blocking layer only needs to have a thickness capable of preventing water penetration and does not need to be as thick as the conventional insulation layer 2120, it is possible to reduce an outer diameter of the insulated wire by using the water-blocking layer.

However, the water-blocking layer practically does not contain a flame retardant and thus has poor flame retardancy. Therefore, if such water-blocking layer is provided on the surface of the insulated wire, flame retardancy of the entire insulated wire may decrease.

In this regard, when the water-blocking layer having poor flame retardancy is interposed between the flame-retardant layers, e.g., when a cover layer is composed of three layers which are a first flame-retardant layer, a water-blocking layer and a second flame-retardant layer arranged in this order from the conductor side, the cover layer can maintain high DC stability by having the water-blocking layer which prevents water ingress to the first flame-retardant layer, while maintaining flame retardancy.

In addition, when an oxygen index, as a measure of flame retardancy, of each flame-retardant layer is more than 45, the cover layer can maintain desired high flame retardancy even when the thickness of each flame-retardant layer is reduced.

The present invention was made based on the above-described findings.

Configuration of Insulated Wire

Figure 4:
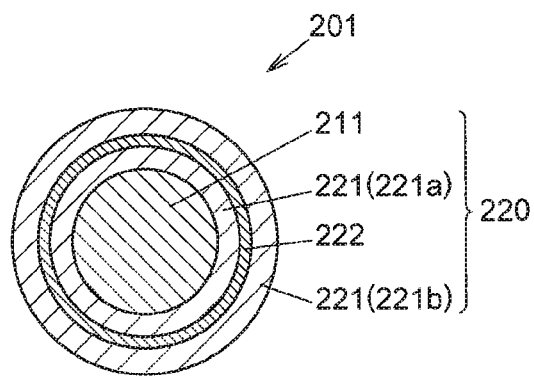
FIG. 4 is a cross sectional view showing an insulated wire in the second embodiment of the invention taken perpendicular to the longitudinal direction thereof.

An insulated wire in the second embodiment of the invention will be described blow in reference to the drawings. FIG. 4 is a cross sectional view showing an insulated wire in the second embodiment of the invention taken perpendicular to the longitudinal direction thereof. Hereinafter, each of the numerical ranges expressed using "-" includes the numerical values before and after "-" as the lower and upper limits.

As shown in FIG. 4, an insulated wire 201 in the second embodiment is provided with a conductor 211 and a cover layer 220.

Conductor

As the conductor 211, it is possible to use a commonly-used metal wire, e.g., a copper wire, a copper alloy wire, an aluminum wire, a gold wire or a silver wire, etc. Alternatively, a metal wire of which outer surface is plated with a metal such as tin or nickel may be used. It is also possible to use a bunch-stranded conductor formed by twisting metal strands. The cross-sectional area and outer diameter of the conductor 211 can be appropriately changed according to the electrical characteristics required for the insulated wire 201, and for example, the cross-sectional area is 1 $mm^2$-10 $mm^2$ and the outer diameter is 1.25 mm-3.9 mm.

Cover Layer

The cover layer 220 is provided around the conductor 211. In the second embodiment, the cover layer 220 is configured such that a water-blocking layer 222 is interposed between two flame-retardant layers 221 and one of the flame-retardant layers 221 is the outermost layer. In other words, the cover layer 220 is formed by laminating three layers which are the flame-retardant layer 221, the water-blocking layer 222 and the other flame-retardant layer 221 arranged in this order from the conductor 211 side. In the following description of the cover layer 220, the flame-retardant layer 221 covered by the water-blocking layer 222 and located inside is referred to as "inner flame-retardant layer 221a", and the flame-retardant layer 221 located outermost is referred to as "outer flame-retardant layer 221b".

Inner Flame-Retardant Layer

The inner flame-retardant layer 221a is formed by, e.g., extruding a flame-retardant resin composition on the outer surface of the conductor 211 and is configured to have an oxygen index of more than 45. In the second embodiment, the inner flame-retardant layer 221a is formed to have an oxygen index of more than 45 and contributes to flame retardancy of the cover layer 220. In addition, since the water-blocking layer 222 covering the inner flame-retardant layer 221a prevents water ingress when the insulated wire 201 is immersed in water for evaluation of DC stability, the inner flame-retardant layer 221a can have high insulation reliability and also contributes to DC stability of the cover layer 220. In other words, the inner flame-retardant layer 221a contributes not only flame retardancy but also DC stability, and thus functions as a flame-retardant insulation layer.

The oxygen index of the inner flame-retardant layer 221a is not specifically limited as long as it is greater than 45, and in view of flame retardancy, a higher oxygen index is more preferable. The oxygen index is a measure of flame retardancy, and the oxygen index specified by JIS K 7201-2 is used in the second embodiment.

The flame-retardant resin composition constituting the inner flame-retardant layer 221a contains a resin and, if required, a flame retardant.

The type of the resin constituting the inner flame-retardant layer 221a is appropriately changed according to the characteristics, e.g., elongation and strength, etc., required for the insulated wire 201. It is possible to use, e.g., polyolefin, polyimide and polyether ether ketone (PEEK), etc. When polyolefin is used, the amount of the flame retardant to be mixed is increased to increase the oxygen index of the flame-retardant layer 221. Meanwhile, when polyimide or PEEK is used, the flame retardant does not need to be mixed since these resins per se have high flame retardancy. As compared to polyimide, etc., polyolefin provides better moldability of the flame-retardant layer 221 due to its low molding temperature and imparts better bendability to the flame-retardant layer 221 due to its high elongation at break.

The polyolefin used here can be a polyethylene-based resin or a polypropylene-based resin, etc., and it is particularly preferable to use the polyethylene-based resin. Examples of the polyethylene-based resin used here include linear low-density polyethylene (LLDPE), low-density polyethylene (LDPE), high-density polyethylene (HDPE), ethylene-α-olefin copolymer, ethylene-vinyl acetate copolymer (EVA), ethylene-acrylic ester copolymer and ethylene-propylene-diene copolymer, etc. These resins may be used alone or in combination of two or more. Among polyolefin-based resins, EVA is particularly preferable so that the inner flame-retardant layer 221a can have higher flame retardancy.

The flame retardant is preferably a halogen-free flame retardant since it does not produce toxic gas, and for example, a metal hydroxide can be used. The metal hydroxide is decomposed and dehydrated when the inner flame-retardant layer 221a is heated and burnt and the released water lowers the temperature of the inner flame-retardant layer 221a and suppresses combustion thereof. As the metal hydroxide, it is possible to use, e.g., magnesium hydroxide, aluminum hydroxide, calcium hydroxide and these metal hydroxides with dissolved nickel. These flame retardants may be used alone or in a combination of two or more.

The flame retardant is preferably surface-treated with, e.g., a silane coupling agent, a titanate-based coupling agent, fatty acid such as stearic acid, fatty acid salt such as stearate, or fatty acid metal such as calcium stearate to control mechanical characteristics (a balance between tensile strength and elongation) of the inner flame-retardant layer 221a.

The amount of the flame retardant to be mixed is preferably 150 parts by mass-250 parts by mass with respect to 100 parts by mass of the resin so that the flame-retardant layer 221 can have an oxygen index of greater than 45. When the mixed amount is less than 150 parts by mass, the insulated wire 201 may not be able to have desired high flame retardancy. When the mixed amount is more than 250 parts by mass, mechanical characteristics of the inner flame-retardant layer 221a may decrease, resulting in a decrease in elongation percentage.

The inner flame-retardant layer 221a may be cross-linked. For example, the inner flame-retardant layer 221a may be formed by extruding a resin composition containing a cross-linking aid and then cross-linking by exposure to an electron beam after extrusion molding.

Water-Blocking Layer

The water-blocking layer 222 has a water absorption of not more than 0.5% at saturation and is configured to have a small water absorption rate or a small water diffusion coefficient. The water-blocking layer 222, which has high water-blocking properties and is hard for water to penetrate, can prevent water ingress to the inner flame-retardant layer 221a located on the inner side of the cover layer 220. The water-blocking layer 222 practically does not contain a flame retardant and has poor flame retardancy, but is covered and protected by the outer flame-retardant layer 221b (described later).

A material having a water absorption of not more than 0.5% at saturation is used to form the water-blocking layer 222, and the lower limit of the water absorption at saturation is not specifically limited and may be 0%. When more than 0.5%, the water-blocking layer 222 is likely to absorb water and cannot prevent water ingress to the inner flame-retardant layer 221a. The term "water absorption at saturation" as used herein means water saturation derived by Fick's law in accordance with JIS K 7209:2000.

The material used to form the water-blocking layer 222 is preferably a resin in view of molding processability of the water-blocking layer 222 and can be the same resin as used for the inner flame-retardant layer 221a. For the water-blocking layer 222, polyolefin is more preferable. Among the polyolefins, linear low-density polyethylene (LLDPE) is particularly preferable due to its capability of reducing water absorption, excellent moldability, relatively high elongation at break, other excellent characteristics such as oil resistance (solvent resistance) and the low cost.

When the water-blocking layer 222 is formed of a resin such as LLDPE, for example, a resin composition containing LLDPE is extruded on the outer surface of the inner flame-retardant layer 221a. To further improve water-blocking properties of the water-blocking layer 222, the water-blocking layer 222 is preferably formed of a cross-linked body obtained by cross-linking a resin composition containing a cross-linking agent or a cross-linking aid. The resin can have a stronger molecular structure when cross-linked and it is thereby possible to improve water-blocking properties of the water-blocking layer 222. In addition, since this also improves strength of the water-blocking layer 222, high water-blocking properties can be maintained without impairing strength even if the thickness of the water-blocking layer 222 is reduced.

Preferably, the cross-linked body constituting the water-blocking layer 222 is cross-linked so as to have a gel fraction of 40%-100%. Since strength and water-blocking properties of the water-blocking layer 222 can be increased by increasing the gel fraction of the cross-linked body, the thickness of the water-blocking layer 222 can be reduced.

When the water-blocking layer 222 is cross-linked, it is preferable to mix a known cross-linking agent or cross-linking aid to the resin composition. As the cross-linking agent, it is possible to use, e.g., an organic peroxide and a silane coupling agent, etc. As the cross-linking aid, it is possible to use, e.g., multifunctional monomers such as triallyl isocyanurate or trimethylolpropane acrylate. The mixed amount thereof is not specifically limited and is appropriately changed so that, e.g., the degree of cross-linking of the water-blocking layer 222 is 40%-100% in terms of gel fraction. The cross-linking method can be a known method such as chemical cross-linking or electron beam cross-linking depending on the type of cross-linking agent.

Outer Flame-Retardant Layer

The outer flame-retardant layer 221b is formed by, e.g., extruding a flame-retardant resin composition containing a flame retardant on the outer surface of the water-blocking layer 222 and is configured to have an oxygen index of more than 45 in the same manner as the inner flame-retardant layer 221a. The outer flame-retardant layer 221b is located on the surface of the cover layer 220 and is not covered with the water-blocking layer 222 unlike the inner flame-retardant layer 221a. Therefore, the outer flame-retardant layer 221b is easy for water to penetrate and thus does not contribute to DC stability, but suppresses a decrease in flame retardancy of the entire cover layer 220 by covering the water-blocking layer 222 having poor flame retardancy.

The flame-retardant resin composition used to form the outer flame-retardant layer 221b can be the same as that used for the inner flame-retardant layer 221a. In addition, the outer flame-retardant layer 221b may be cross-linked in the same manner as the inner flame-retardant layer 221a. To cross-link the outer flame-retardant layer 221b, for example, a cross-linking agent or a cross-linking aid is mixed to the resin composition used to form the outer flame-retardant layer 221b and the resin composition is extruded and then cross-linked. The cross-linking method is not specifically limited and a known method can be used.

Laminated Structure of Cover Layer

Next, the laminated structure of the cover layer 220 will be described.

In the cover layer 220, the thickness of the water-blocking layer 222 is not specifically limited but is preferably not less than 0.05 mm to ensure water-blocking properties. The water-blocking layer 222 when having a thickness of not less than 0.05 mm can have higher strength and thereby can be prevented from being broken when the insulated wire 201 is bent. As a result, it is possible to maintain water-blocking properties of the water-blocking layer 222, thereby allowing the inner flame-retardant layer 221a to contribute to DC stability. Here, the upper limit of the thickness of the water-blocking layer 222 is not specifically limited, but is preferably not more than 0.1 mm in view of flame retardancy of the insulated wire 201. The water-blocking layer 222 practically does not contain a flame retardant and thus may cause a decrease in flame retardancy of the insulated wire 201. However, when the thickness of the water-blocking layer 222 is not more than 0.1 mm, flame retardancy of the insulated wire 201 is not impaired and can be maintained at high level. It is also possible to reduce the outer diameter of the insulated wire 201 when the water-blocking layer 222 has such thickness.

In addition, in the cover layer 220, the respective thicknesses of the plural flame-retardant layers 221 are not specifically limited and can be appropriately changed according to flame retardancy and DC stability which are required for the cover layer 220. To obtain high flame retardancy, the total thickness of the plural flame-retardant layers 221 is preferably not less than 0.35 mm.

The thickness of the inner flame-retardant layer 221a, which contributes to flame retardancy and DC stability of the cover layer 220, is preferably at least not less than 0.5 times the strand diameter of the metal wires constituting the conductor 211, or not less than 0.1 mm when the strand diameter is not more than 0.2 mm, to obtain desired DC stability. When the inner flame-retardant layer 221a is excessively thin, bumps and recesses on the surface of the conductor 211 due to twisting of the plural metal wires may not be sufficiently covered, leaving bumps and recesses on the surface of the water-blocking layer 222 provided on the inner flame-retardant layer 221a and causing a decrease in DC stability. However, when the inner flame-retardant layer 221a has a thickness in the above-mentioned range, the inner flame-retardant layer 221a can have a smooth surface and this reduces the bumps and recesses on the surface of the water-blocking layer 222, thereby increasing DC stability. On the other hand, the upper limit is not specifically limited and can be appropriately changed by taking into account flame retardancy of the cover layer 220 and diameter reduction of the insulated wire 201.

The outer flame-retardant layer 221b, which covers the water-blocking layer 222 to retard burning of the water-blocking layer 222, preferably has a thickness of at least not less than 0.25 mm. On the other hand, the upper limit is not specifically limited and can be appropriately changed by taking into account flame retardancy of the cover layer 220 and diameter reduction of the insulated wire 201.

As a result of forming the cover layer 220 so that the respective layers have the thicknesses in the above-mentioned ranges, it is possible to obtain high DC stability as well as high flame retardancy while reducing a diameter of the insulated wire 201.

Effects of the Second Embodiment

In the second embodiment, one or several effects described below are obtained.

In the second embodiment, the cover layer 220 is configured such that the water-blocking layer 222 having a water absorption of not more than 0.5% at saturation is interposed between the flame-retardant layers 221 having an oxygen index of more than 45, i.e., the inner flame-retardant layer 221a, the water-blocking layer 222 and the outer flame-retardant layer 221b are laminated in this order from the conductor 211 side.

Since the water-blocking layer 222 having a water absorption of not more than 0.5% at saturation can prevent water ingress to the inner flame-retardant layer 221a and allows the inner flame-retardant layer 221a to maintain insulation reliability, the inner flame-retardant layer 221a can functions as a flame-retardant insulation layer which can contribute to not only flame retardancy but also DC stability. As a result, it is possible to maintain desired DC stability without forming the insulation layer 2120 contributing DC stability which is formed in the conventional insulated wire 2100 shown in FIG. 8. In contrast to the insulation layer 2120 which needs to be formed thick to obtain desired DC stability, the water-blocking layer 222 can be thin to the extent that water-blocking properties are obtained. Thus, by forming the water-blocking layer 222 instead of the insulation layer 2120, the outer diameter of the insulated wire 201 can be reduced by the thickness difference.

Meanwhile, the water-blocking layer 222 practically does not contain a flame retardant and may decrease may cause a decrease in flame retardancy of the cover layer 220, but high flame retardancy of the cover layer 220 as a whole can be maintained by covering the water-blocking layer 222 with the outer flame-retardant layer 221b.

Furthermore, since each of the flame-retardant layers 221 has an oxygen index of more than 45 and has high flame retardancy, desired flame retardancy of the entire cover layer 220 can be maintained even when the respective thicknesses of the flame-retardant layers 221 are reduced.

As such, in the second embodiment, the insulated wire 201 can have a reduced outer diameter while achieving both high flame retardancy and high DC stability.

To form the conventional insulated wire 2100 as shown in FIG. 8 so as to achieve, e.g., both high flame retardancy in compliance with EN 45545-2 and high DC stability in compliance with EN 50305.6.7, the thickness of the cover layer including the insulation layer 2120 not containing a flame retardant and the flame-retardant layer 2130, i.e., the cover thickness, needs to be not less than 0.6 mm when using the conductor 2110 with an outer diameter of 1.25 mm-3.9 mm (the cross-sectional area of 1 $mm^2$-10 $mm^2$), resulting in the wire outer diameter of not less than 2.6 mm.

On the other hand, in the second embodiment, the thickness of the cover layer 220 including the inner flame-retardant layer 221a and the water-blocking layer 222, etc., can be reduced to about 0.45 mm-0.5 mm even when the conductor 211 has the same outer diameter, and the wire outer diameter can be reduced to the range of 2.1 mm-2.3 mm.

The flame-retardant resin composition constituting the flame-retardant layer 221 preferably contains at least one resin selected from linear low-density polyethylene (LLDPE), low-density polyethylene (LDPE), high-density polyethylene (HDPE), ethylene-vinyl acetate copolymer (EVA), ethylene-acrylic ester copolymer and ethylene-propylene-diene copolymer. In case of using such resins, even when a large amount of flame retardant is mixed so that the flame-retardant layer 221 can have an oxygen index of more than 45, a decrease in elongation or strength of the flame-retardant layer 221 caused by mixing the flame retardant can be suppressed. In addition, among these resins, EVA containing vinyl acetate is excellent in flame retardancy and can improve flame retardancy of the flame-retardant layer 221.

The flame-retardant resin composition constituting the flame-retardant layer 221 preferably contains not less than 150 parts by mass and not more than 250 parts by mass of flame retardant with respect to 100 parts by mass of the resin. When such amount of flame retardant is mixed, high flame retardancy with an oxygen index of more than 45 can be obtained without impairing mechanical characteristics (e.g., elongation or strength, etc.) of the flame-retardant layer 221.

The water-blocking layer 222 is preferably formed of a resin, which is preferably linear low-density polyethylene (LLDPE). When using LLDPE, it is easy to form the water-blocking layer 222 by extrusion molding. Particularly, when using LLDPE, water absorption at saturation of the water-blocking layer 222 can be easily adjusted to not more than 0.5% and it is thus possible to increase water-blocking properties as well as other characteristics such as oil resistance.

It is preferable that the water-blocking layer 222 be formed of a cross-linked body which is obtained by cross-linking HDPE and has a gel fraction of 40%-100%. When the gel fraction is in such range, strength and water-blocking properties of the water-blocking layer 222 are increased and the thickness of the water-blocking layer 222 thus can be reduced. As a result, the outer diameter of the insulated wire 201 can be further reduced.

In the second embodiment, the insulated wire 201 may not be reduced in diameter and may have the same diameter as the conventional wires. In this case, it is possible to further increase flame retardancy and DC stability by increasing the thickness of the flame-retardant layer 221.

Other Embodiments of the Invention

Although the second embodiment of the invention has been specifically described, the invention is not limited to the above-mentioned embodiment and can be appropriately changed without departing from the gist of the invention.

Figure 5:
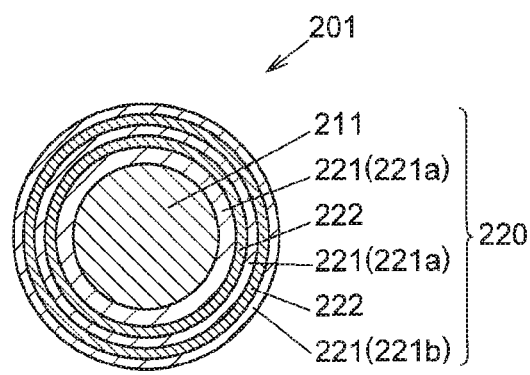
FIG. 5 is a cross sectional view showing an insulated wire in another embodiment of the invention taken perpendicular to the longitudinal direction thereof.

Although the cover layer 220 having the three-layer structure formed by sequentially laminating the flame-retardant layer 221, the water-blocking layer 222 and the other flame-retardant layer 221 on the conductor 211 has been described as an example in the second embodiment, the invention is not limited thereto. For example, plural flame-retardant layers 221 and plural water-blocking layers 222 may be provided, such as a five-layer structure in which two water-blocking layers 222 are interposed each between three flame-retardant layers 221 as shown in FIG. 5. In FIG. 5, one of the three flame-retardant layers 221 which is located on the surface of the cover layer 220 is the outer flame-retardant layer 221b, and the other flame-retardant layers 221 covered with the water-blocking layers 222 are the inner flame-retardant layers 221a.

In the insulated wire 201 shown in FIG. 5, the thickness of each layer is not specifically limited and, for example, the total thickness of the water-blocking layers 222 is 0.05 mm-0.1 mm, the thickness of the inner flame-retardant layer 221a is not less than 0.05 mm, and the thickness of the outer flame-retardant layer 221b is not less than 0.25 mm. As described above, to form the outer water-blocking layer 222 with a smooth surface and to ensure DC stability of the cover layer 220, the thickness of each layer is adjusted so that the total thickness of the layers located inside the outer water-blocking layer 222 is not less than 0.5 times the strand diameter of the metal wires constituting the conductor 211, or not less than 0.1 mm when the strand diameter is not more than 0.2 mm. For example, when the conductor 211 used in the insulated wire 201 shown in FIG. 5 is a twisted conductor having an outer diameter of 1.25 mm formed by twisting 0.18 mm-diameter metal wires, the thickness of each layer is adjusted and provided as follows: a 0.05 mm-thick inner flame-retardant layer 221a, a 0.05 mm-thick water-blocking layer 222, another 0.05 mm-thick inner flame-retardant layer 221a, another 0.05 mm-thick water-blocking layer 222 and a 0.25 mm-thick outer flame-retardant layer 221b are provided from the conductor 211 side. When the total thickness of the layers located inside the outer water-blocking layer 222 is 0.15 mm which is not less than 0.5 times the strand diameter of the metal wires, the outer water-blocking layer 222 can have a smooth surface and it is thus possible to ensure higher DC stability.

In addition, although the water-blocking layer 222 formed of a resin such as LLDPE has been described in the second embodiment, the invention is not limited thereto. The water-blocking layer 222 may be formed of a material other than the resin and may be formed of, e.g., a ceramic or glass, etc.

The water-blocking layer 222 when formed of a ceramic or glass can be formed by treating the outer surface of the flame-retardant layer 221 with alumina, zirconia or diamond-like carbon (DLC) using the plasma CVD method. The thickness of the water-blocking layer 222 in this case is preferably 0.005 mm-0.01 mm.

Each of the resin compositions constituting the flame-retardant layer 221 and the water-blocking layer 222 may also contain other additives, if required. For example, a flame-retardant aid, an antioxidant, a lubricant, a softener, a plasticizer, an inorganic filler, a compatibilizing agent, a stabilizer, carbon black and a colorant, etc., may be contained. These additives can be contained as long as the respective characteristics of the flame-retardant layer 221 and the water-blocking layer 222 are not impaired.

Figure 6:
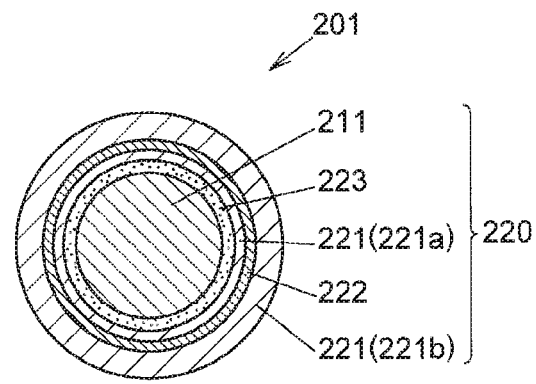
FIG. 6 is a cross sectional view showing an insulated wire in another embodiment of the invention taken perpendicular to the longitudinal direction thereof.

In addition, although the cover layer 220 composed of the flame-retardant layers 221 and the water-blocking layer(s) 222 has been described in the second embodiment, the cover layer 220 may be provided with a resin layer which has different characteristics from the flame-retardant layer 221 or the water-blocking layer 222. For example, to improve electrical characteristics, a semiconducting layer 223 may be provided between the conductor 211 and the inner flame-retardant layer 221a, as shown in FIG. 6. The thickness of each layer can be, e.g., 0.1 mm for the semiconducting layer 223, 0.05 mm for the inner flame-retardant layer 221a, 0.075 mm for the water-blocking layer 222 and 0.25 mm for the outer flame-retardant layer 221b, in this order from the conductor 211 side.

Figure 7:
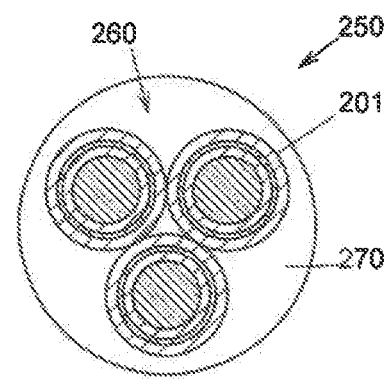
FIG. 7 is a cross sectional view showing a cable using the insulated wire of the invention, taken perpendicular to the longitudinal direction thereof.

The insulated wire 201 may be used directly for, e.g., wiring in rolling stocks or vehicles, but can be used as a core of a cable. In detail, as shown in FIG. 7, a cable 50 can be configured such that a sheath 70 having flame retardancy is provided around a core 60 formed using three insulated wires 201, i.e., the core 60 formed by twisting three insulated wires 201. Although FIG. 7 shows the core 60 composed of three insulated wires 201, the number of the insulated wires 201 is not limited to three and can be one, or two or more.

Examples

The invention will be described in more detail below in reference to Examples. However, the invention is not limited thereto.

The following materials were used in Examples and Comparative Examples.

Ethylene-vinyl acetate copolymer (EVA): "Evaflex EV170", manufactured by Du Pont-Mitsui Polychemical Maleic acid-modified polymer: "TAFMER MH7020", manufactured by Mitsui Chemicals Thermoplastic polyimide: "AURUM PL450C", manufactured by Mitsui Chemicals
Silicone-modified polyetherimide: "STM1500", manufactured by SABIC
Linear low-density polyethylene (LLDPE): "Evolue SP2030", manufactured by Prime Polymer
Polyether ether ketone (PEEK): "KetaSpire KT-820NT", manufactured by Solvay Specialty Polymers
Flame retardant (magnesium hydroxide): "Kisuma 5A", manufactured by Kyowa Chemical Industry
Blended antioxidant: "ADK STAB AO-18", manufactured by ADEKA
Phenolic antioxidant: "Irganox 1010", manufactured by BASF
Carbon black: "Asahi Thermal", manufactured by Asahi Carbon
Lubricant (Zinc stearate)
Cross-linking aid (trimethylolpropane acrylate (TMPT)): manufactured by Shin-Nakamura Chemical Preparation of Flame-Retardant Resin Composition Firstly, a flame-retardant resin composition was prepared by mixing the above-listed materials with the mixing proportions shown in Table 3.

In detail, firstly, a mixture of 75 parts by mass of EVA, 25 parts by mass of maleic acid-modified polymer, 150 parts by mass of magnesium hydroxide, 2 parts by mass of cross-linking aid, 2 parts by mass of blended antioxidant, 2 parts by mass of carbon black and 1 part by mass of lubricant was kneaded by a 75 L wonder kneader. Then, a strand was formed by extruding the kneaded mixture by an extruder, cooled with water and cut, thereby obtaining a flame-retardant resin composition 1 (also referred to as "flame-retardant material 1") in the form of pellets. The pellets had a columnar shape with a diameter of about 3 mm and a height of about 5 mm. The flame-retardant material 1 had an oxygen index of 45.5 and a water absorption of more than 0.5% at saturation.

Flame-retardant materials 2 to 7 were prepared in the same manner, with various mixing proportions as shown in Table 3. The oxygen index and the water absorption at saturation of each material are shown in Table 3.

Preparation of Water-Blocking Material

Subsequently, water-blocking materials 1 and 2 were prepared as resin compositions for forming water-blocking layer.

In detail, the water-blocking material 1 was prepared by dry blending and kneading 100 parts by mass of LLDPE and 1 part by mass of phenolic antioxidant using a wonder kneader. Meanwhile, PEEK was prepared as the water-blocking material 2.

Manufacturing of Insulated Wire

Example 5

Subsequently, an insulated wire was made using the above-described flame-retardant material and water-blocking material.

In detail, three layers of the flame-retardant material 1, the water-blocking material 1 and the flame-retardant material 1 having the respective predetermined thicknesses were co-extruded around a tin-plated copper conductor having an outer diameter of 1.25 mm, and were cross-linked by exposure to an electron beam so that an absorbed dose was 75 kGy, thereby obtaining an insulated wire in Example 5. The obtained insulated wire had a 0.1 mm-thick inner flame-retardant layer, a 0.1 mm-thick water-blocking layer and a 0.27 mm-thick outer flame-retardant layer in this order from the conductor side, the thickness of the entire cover layer was 0.47 mm, and the wire outer diameter was 2.19 mm. The water-blocking layer had a water absorption of not more than 0.5% at saturation. The configuration of the insulated wire in Example 5 is summarized in Table 4. Table 4 is shown to indicate that a resin layer (1), a resin layer (2) and a resin layer (3) are formed in this order from the conductor side. For the three-layer co-extrusion, flows from three short-screw extruders are combined in a crosshead.

TABLE 3

| | | | Flame-retardant resin compositions | | | | | | |
|---|---|---|---|---|---|---|---|---|---|
| | | | Flame-Retardant material 1 | Flame-retardant material 2 | Flame-retardant material 3 | Flame-retardant material 4 | Flame-retardant material 5 | Flame-retardant material 6 | Flame-retardant material 7 |
| Mixing proportions | Polymer component | EVA | 75 | 75 | 75 | 75 | — | — | 75 |
| | | Maleic acid-modified polymer | 25 | 25 | 25 | 25 | — | — | 25 |
| | | Thermoplastic polyimide | — | — | — | — | 100 | — | — |
| | | Silicone-modified polyetherimide | — | — | — | — | — | 100 | — |
| | Flame retardant | Magnesium hydroxide | 150 | 200 | 250 | 270 | — | — | 140 |
| | Cross-linking aid | | 2 | 2 | 2 | 2 | — | — | 2 |
| | Blended antioxidant | | 2 | 2 | 2 | 2 | — | — | 2 |
| | Carbon black | | 2 | 2 | 2 | 2 | — | — | 2 |
| | Lubricant (Zinc stearate) | | 1 | 1 | 1 | 1 | — | — | 1 |
| Water absorption at saturation [%] | | | >0.5 | >0.5 | >0.5 | >0.5 | ≤0.5 | ≤0.5 | >0.5 |
| Oxygen index | | | 45.5 | 50 | 56.5 | 58 | 47 | 46 | 44.5 |

TABLE 4

|  |  |  |  | Examples |  |  |  |  |  |  |  |  |
|---|---|---|---|---|---|---|---|---|---|---|---|---|
|  |  |  |  | 5 | 6 | 7 | 8 | 9 | 10 | 11 | 12 | 13 |
| Insulated wire | Wire outer diameter [mm] |  |  | 2.19 | 2.19 | 2.19 | 2.19 | 2.19 | 2.19 | 2.15 | 2.19 | 2.19 |
|  | Conductor | Conductor diameter [mm] |  |  |  |  |  | 1.25 |  |  |  |  |
|  | Cover layer | Laminated structure | Resin layer (1) Type | Inner flame-retardant layer |  |  |  |  |  |  |  |  |
|  |  |  | Material | FR 1 | FR 4 | FR 2 | FR 3 | FR 4 | FR 1 |  | FR 5 | FR 6 |
|  |  |  | Thickness [mm] | 0.10 |  |  |  |  |  | 0.15 | 0.10 |  |
|  |  |  | Resin layer (2) Type | Water-blocking layer |  |  |  |  |  |  |  |  |
|  |  |  | Material | WB 1 (LLDPE) |  |  |  |  |  | WB 2 (PEEK) | WB 1 (LLDPE) |  |
|  |  |  | Thickness [mm] | 0.10 |  |  |  |  |  | 0.15 | 0.10 |  |
|  |  |  | Resin layer (3) Type | Outer flame-retardant layer |  |  |  |  |  |  |  |  |
|  |  |  | Material | FR 1 |  | FR 2 | FR 3 | FR 4 |  | FR 1 |  |  |
|  |  |  | Thickness [mm] | 0.27 |  |  |  |  |  | 0.15 | 0.27 |  |
|  |  | Thickness of cover layer [mm] |  | 0.47 |  |  |  |  |  | 0.45 | 0.47 |  |
| Evaluation | Flame retardancy |  |  | ○ | ○ | ○ | ○ | ○ | ○ | ○ | ○ | ○ |
|  | DC stability |  |  | ○ | ○ | ○ | ○ | ○ | ○ | ○ | ○ | ○ |

FR: flame-retardant material,
WB: water-blocking material

Examples 6 to 13

Insulated wires in Examples 6 to 13 were made in the same manner as Example 5, except that the types of flame-retardant material and water-blocking material, and the thicknesses of the inner flame-retardant layer, the water-blocking layer and the outer flame-retardant layer were appropriately changed as shown in Table 4. In each Example, the water-blocking layer had a gel fraction equivalent to that in Example 5 and a water absorption of not more than 0.5% at saturation.

Comparative Examples 7 to 10

Insulated wires in Comparative Examples 7 to 10 were made to have the cover layer with the same laminated structure as that in Example 5, except that at least one of the inner flame-retardant layer and the outer flame-retardant layer was formed of the flame-retardant material 7 having an oxygen index of 44.5 as shown in Table 5 below.

TABLE 5

|  |  |  |  |  | Comparative Examples |  |  |  |  |  |  |  |  |
|---|---|---|---|---|---|---|---|---|---|---|---|---|---|
|  |  |  |  |  | 7 | 8 | 9 | 10 | 11 | 12 | 13 | 14 | 15 |
| Insulated wire | Wire outer diameter [mm] |  |  |  | 2.19 | 2.19 | 2.19 | 2.19 | 2.19 | 2.45 | 2.19 | 2.25 | 2.25 |
|  | Conductor | Conductor diameter [mm] |  |  |  |  |  |  | 1.25 |  |  |  |  |
|  | Cover layer | Laminated structure | Resin layer (1) | Type | Inner flame-retardant layer |  |  |  | Water-blocking layer |  | Water-blocking layer |  |  |
|  |  |  |  | Material | FR 7 |  |  |  | WB 1 (LLDPE) |  | WB 1 (LLDPE) |  |  |
|  |  |  |  | Thickness [mm] | 0.10 |  |  |  | 0.05 | 0.10 | 0.10 | 0.05 |  |
|  |  |  | Resin layer (2) | Type | Water-blocking layer |  |  |  | Flame-retardant layer |  | Flame-retardant layer |  |  |
|  |  |  |  | Material | WB 1 (LLDPE) |  | WB 2 (PEEK) | FR 5 | FR 4 |  | FR 4 |  | FR 1 |
|  |  |  |  | Thickness [mm] | 0.10 |  |  |  | 0.37 | 0.45 | 0.37 | 0.45 |  |
|  |  |  | Resin layer (3) | Type | Outer flame-retardant layer |  |  |  | Water-blocking layer |  | — |  |  |
|  |  |  |  | Material | FR 7 |  | FR 4 |  | WB 1 (LLDPE) |  |  |  |  |
|  |  |  |  | Thickness [mm] | 0.27 |  |  |  | 0.05 | 0.05 |  |  |  |
|  |  | Thickness of Cover layer [mm] |  |  | 0.47 |  |  |  | 0.47 | 0.60 | 0.47 | 0.50 |  |
| Evaluation | Flame retardancy |  |  |  | X | X | X | X | X | X | X | ○ | ○ |
|  | DC stability |  |  |  | ○ | ○ | ○ | ○ | X | ○ | X | X | X |

TABLE 5-continued

|  |  |  |  |  | Comparative Examples | | |
|---|---|---|---|---|---|---|---|
|  |  |  |  |  | 16 | 17 | 18 |
| Insulated wire | Wire outer diameter [mm] | | | | 2.19 | 2.25 | 2.25 |
|  | Conductor | Conductor diameter [mm] | | | | 1.25 | |
|  | Cover layer | Laminated structure | Resin layer (1) | Type | Flame-retardant layer | Flame-retardant layer | Water-blocking layer |
|  |  |  |  | Material | FR 4 | FR 2 | WB 1 (LLDPE) |
|  |  |  |  | Thickness [mm] | 0.37 | 0.50 | 0.50 |
|  |  |  | Resin layer (2) | Type | Water-blocking layer | — | — |
|  |  |  |  | Material | WB 1 (LLDPE) | | |
|  |  |  |  | Thickness [mm] | 0.10 | | |
|  |  |  | Resin layer (3) | Type | — | | |
|  |  |  |  | Material | | | |
|  |  |  |  | Thickness [mm] | | | |
|  |  | Thickness of Cover layer [mm] | | | 0.47 | 0.50 | 0.50 |
| Evaluation | Flame retardancy | | | | X | ◯ | X |
|  | DC stability | | | | ◯ | X | ◯ |

FR: flame-retardant material,
WB: water-blocking material

Comparative Examples 11 and 12

Insulated wires in Comparative Examples 11 and 12 were made in the same manner as Example 5, except that three layers of the water-blocking material 1, the flame-retardant material 4 and the water-blocking material 1 having the respective predetermined thicknesses were co-extruded around a tin-plated copper conductor to form the cover layer in which a water-blocking layer, a flame-retardant layer and a water-blocking layer were laminated in this order from the conductor side.

Comparative Examples 13 to 15

Insulated wires in Comparative Examples 13 to 15 were made in the same manner as Example 5, except that two layers of the water-blocking material 1 and the flame-retardant material 4 or 1 having the respective predetermined thicknesses were co-extruded around a tin-plated copper conductor to form the cover layer in which a water-blocking layer and a flame-retardant layer were laminated in this order from the conductor side.

Comparative Example 16

An insulated wire in Comparative Example 16 was made in the same manner as Example 5, except that two layers of the flame-retardant material 4 and the water-blocking material 1 having the respective predetermined thicknesses were co-extruded around a tin-plated copper conductor to form the cover layer in which a flame-retardant layer and a water-blocking layer were laminated in this order from the conductor side.

Comparative Examples 17 and 18

Insulated wires in Comparative Examples 17 and 18 were made in the same manner as Example 5, except that a single layer of the flame-retardant material 2 or the water-blocking material 1 having the predetermined thickness was extruded around a tin-plated copper conductor so that only a flame-retardant layer or a water-blocking layer was formed around the conductor.

Evaluation Method

The obtained insulated wires were evaluated by the following methods. The evaluation results are summarized in Tables 4 and 5.

Flame Retardancy

Flame retardancy of the insulated wires was evaluated by the following vertical flame test. The vertical flame test (VFT) was conducted in accordance with the Test for vertical flame propagation for a single insulated wire or cable specified by EN 50265-2. In detail, 600 mm-long insulated wires were held vertical and a flame was applied thereto for 60 seconds. Pass or fail was determined in accordance with the above-mentioned criteria.

DC Stability

DC stability of the insulated wires was evaluated by conducting the DC stability test in accordance with EN 50305.6.7. In detail, voltage of 1500V was applied to the insulated wires immersed in 3% salt water at 85° C., and time to insulation breakdown was measured. In these Examples, DC stability was evaluated as high (◯) when time to insulation breakdown was not less than 240 hours, and evaluated as low (×) when less than 240 hours.

Evaluation Results

In Examples 5 to 13, both DC stability and flame retardancy were achieved at high levels while reducing the wire outer diameters, as shown in Table 4.

On the other hand, in Comparative Examples 7 to 10, since at least one of the inner flame-retardant layer and the outer flame-retardant layer was formed to have an oxygen index of less than 45, flame retardancy of the cover layer was not sufficient.

In Comparative Examples 11 and 12, since the cover layer had a three-layer structure formed by laminating a water-blocking layer, a flame-retardant layer and another water-blocking layer in this order from the conductor side and the easily combustible water-blocking layer was located on the surface of the cover layer, flame retardancy was not sufficient. Particularly in Comparative Example 12, high DC stability was maintained but the cover layer was thick and it was thus difficult to reduce a diameter.

In Comparative Examples 13 to 15, since the cover layer had a two-layer structure formed by providing a flame-retardant layer on a water-blocking layer, the cover layer was likely to absorb water and had poor DC stability. In addition, in Comparative Example 13 in which the flame-retardant layer was thinner than that in Comparative Examples 14 and 15, flame retardancy was also poor.

In Comparative Example 16, high DC stability was maintained since the cover layer had a two-layer structure formed by providing a water-blocking layer on a flame-retardant layer and the water-blocking layer was located on the surface of the cover layer, but flame retardancy was poor due to the easily combustible water-blocking layer.

In Comparative Examples 17 and 18, since the cover layer had only one of a flame-retardant layer or a water-blocking layer, at least one of flame retardancy and DC stability was high but both could not be simultaneously achieved.

As described above, it was confirmed that when providing the cover layer in which a water-blocking layer with low water absorption is interposed between flame-retardant layers having a high oxygen index, it is possible to achieve both high flame retardancy and high DC stability while a diameter of the insulated wire is reduced by reducing the thickness of the entire cover layer.

Preferred Embodiments of the Invention

Preferred embodiments of the invention will be described below.

[14] An aspect of the invention provides an insulated wire comprising:

a conductor; and a cover layer arranged around the conductor, wherein the cover layer comprises plural flame-retardant layers and a water-blocking layer(s), the flame-retardant layers comprising a flame-retardant resin composition and having an oxygen index of more than 45 as specified by JIS K 7201-2 and the water-blocking layer(s) having a water absorption of not more than 0.5% at saturation, and the cover layer is configured that the water-blocking layer(s) is interposed between the plural flame-retardant layers and one of the flame-retardant layers is located outermost.

[15] In the insulated wire defined by [14], preferably, the flame-retardant resin composition constituting the flame-retardant layer comprises at least one resin selected from high-density polyethylene, linear low-density polyethylene, low-density polyethylene, ethylene-α-olefin copolymer, ethylene-vinyl acetate copolymer, ethylene-acrylic ester copolymer and ethylene-propylene-diene copolymer.

[16] In the insulated wire defined by [14] or [15], preferably, the flame-retardant resin composition constituting the flame-retardant layer contains a flame retardant, and not less than 150 parts by mass and not more than 250 parts by mass of the flame retardant is contained with respect to 100 parts by mass of resin.

[17] In the insulated wire defined by any one of [14] to [16], preferably, the water-blocking layer comprises a cross-linked body obtained by cross-linking a resin composition.

[18] In the insulated wire defined by [17], preferably, the resin composition constituting the water-blocking layer comprises high-density polyethylene.

[19] In the insulated wire defined by any one of [14] to [18], preferably, the flame retardant is a metal hydroxide.

[20] Another aspect of the invention provides a cable comprising:

a core comprising at least one insulated wire; and a sheath arranged around the core, wherein the insulated wire comprises a conductor and a cover layer arranged around the conductor, the cover layer comprises plural flame-retardant layers and a water-blocking layer(s), the flame-retardant layers comprising a flame-retardant resin composition and having an oxygen index of more than 45 as specified by JIS K 7201-2 and the water-blocking layer(s) having a water absorption of not more than 0.5% at saturation, and the cover layer is configured that the water-blocking layer(s) is interposed between the plural flame-retardant layers and one of the flame-retardant layers is located outermost.

Third Embodiment

Figure 11:
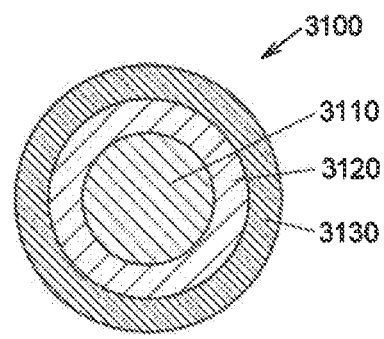
FIG. 11 is a cross sectional view showing a conventional insulated wire taken perpendicular to the longitudinal direction thereof.

Firstly, a conventional insulated wire will be described in reference to FIG. 11. FIG. 11 is a cross sectional view showing a conventional insulated wire taken perpendicular to the longitudinal direction thereof.

As shown in FIG. 11, a conventional insulated wire 3100 is provided with a conductor 3110, an insulation layer 3120 arranged around the conductor 3110, and a flame-retardant layer 3130 arranged around the insulation layer 3120 and containing a flame retardant.

In the insulated wire 3100, the flame-retardant layer 3130 is formed of a resin in the same manner as the insulation layer 3120 and thus exhibits certain insulating properties, but has low insulation reliability and does not really contribute to DC stability. As described later, DC stability is one of the electrical characteristics evaluated by the DC stability test in accordance with EN 50305.6.7 and is a measure of insulation reliability which indicates that insulation breakdown does not occur in the insulated wire 3100 even after the lapse of a predetermined period of time under application of predetermined voltage in 3% salt water.

As a result of study by the inventors, it was found that reason why the flame-retardant layer 3130 does not contribute to DC stability is that water absorption is increased by mixing a flame retardant. In more detail, microscopic spaces are formed around the flame retardant in the flame-retardant layer 3130 due to low adhesion between the resin constituting the flame-retardant layer 3130 and the flame retardant. These spaces allow water to penetrate the flame-retardant layer 3130 which is thereby likely to absorb water. In such flame-retardant layer 3130, a conductive path is formed due to water penetration and insulation breakdown is likely to occur when the insulated wire 3100 is immersed in water for evaluation of DC stability, hence, low insulation reliability. As such, insulating properties of the flame-retardant layer 3130 is likely to decrease due to water absorption, and the flame-retardant layer 3130 thus does not contribute to DC stability.

On the other hand, since the insulation layer 3120 is covered with the flame-retardant layer 3130, it is not necessary to mix a flame retardant to the insulation layer 3120. Therefore, the insulation layer 3120 does not exhibit flame retardancy unlike the flame-retardant layer 3130, but is formed to exhibit low water absorption and contributes to DC stability.

As such, in the conventional insulated wire 3100, the insulation layer 3120 contributes to DC stability and the flame-retardant layer 3130 contributes to flame retardancy. This means that both the insulation layer 3120 and the flame-retardant layer 3130 need to be thick to achieve both high levels of DC stability and flame retardancy, and none of these layers can be easily thinned even for reducing a diameter of the insulated wire 3100.

The present inventors considered that since the conventional insulated wire 3100 has the water-absorbent flame-retardant layer 3130 as the outermost layer and this causes a decrease in DC stability (insulation reliability), the flame-retardant layer 3130 can contribute to DC stability in addition to flame retardancy by preventing water penetration through the flame-retardant layer 3130, which leads to thickness reduction of the insulation layer 3120 and eventually reduction of an outer diameter of the insulated wire 3100.

Then, a method of preventing water penetration through the flame-retardant layer 3130 was studied. As a result, it was found that a water-blocking layer with low water absorption should be provided around a flame-retardant layer. In this case, since water penetration through the flame-retardant layer can be prevented by the water-blocking layer, the flame-retardant layer can function as a resin layer which has not only flame retardancy but also DC stability. As a result, it is possible to eliminate the conventionally-formed insulation layer 3120. In other words, the conventional laminated structure composed of the insulation layer 3120 and the flame-retardant layer 3130 can be replaced with a laminated structure composed of the flame-retardant layer and the water-blocking layer. Since the water-blocking layer only needs to have a thickness capable of preventing water penetration and does not need to be as thick as the conventional insulation layer 3120, it is possible to reduce an outer diameter of the insulated wire by using the water-blocking layer.

However, the water-blocking layer practically does not contain a flame retardant and thus has poor flame retardancy. Therefore, if such water-blocking layer is provided as the outermost layer of the insulated wire, flame retardancy of the entire insulated wire may decrease. In this regard, when the water-blocking layer having poor flame retardancy is interposed between the flame-retardant layers, e.g., when a cover layer is composed of three layers which are a first flame-retardant layer, a water-blocking layer and a second flame-retardant layer arranged in this order from the conductor side, the cover layer can maintain high DC stability by having the water-blocking layer which prevents water ingress to the first flame-retardant layer, while maintaining flame retardancy. In other words, it is possible to reduce an outer diameter of the insulated wire while maintaining high flame retardancy and high DC stability.

In addition, as a result of studying the method of increasing heat resistance of the cover layer, it was found that an antioxidant or a copper inhibitor is preferably mixed to the water-blocking layer. Although the water-blocking layer is interposed between two flame-retardant layers as described above and is thus less likely to be affected by oxidation or metal-induced degradation (copper-induced degradation), heat resistance of the entire cover layer can be significantly improved by mixing an antioxidant and a copper inhibitor to the water-blocking layer.

The present invention was made based on the above-described findings.

Configuration of Insulated Wire

Figure 9:
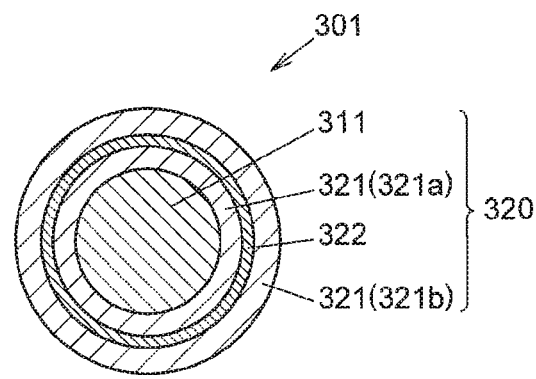
FIG. 9 is a cross sectional view showing an insulated wire in the third embodiment of the invention taken perpendicular to the longitudinal direction thereof.

An insulated wire in the third embodiment of the invention will be described blow in reference to the drawings. FIG. 9 is a cross sectional view showing an insulated wire in the third embodiment of the invention taken perpendicular to the longitudinal direction thereof.

Hereinafter, each of the numerical ranges expressed using "-" includes the numerical values before and after "-" as the lower and upper limits.

As shown in FIG. 9, an insulated wire 301 in the third embodiment is provided with a conductor 311 and a cover layer 320.

Conductor

As the conductor 311, it is possible to use a commonly-used metal wire, e.g., a copper wire, a copper alloy wire, an aluminum wire, a gold wire or a silver wire, etc. Alternatively, a metal wire of which outer surface is plated with a metal such as tin or nickel may be used. It is also possible to use a bunch-stranded conductor formed by twisting metal strands. The outer diameter of the conductor 311 can be appropriately changed according to the electrical characteristics required for the insulated wire 301, and is, e.g., 1.0 mm-6.0 mm.

Cover Layer

The cover layer 320 is provided around the conductor 311. In the third embodiment, the cover layer 320 is configured such that a water-blocking layer 322 is interposed between two flame-retardant layers 321 and one of the flame-retardant layers 321 is the outermost layer. In other words, the cover layer 320 is formed by laminating three layers which are the flame-retardant layer 321, the water-blocking layer 322 and the other flame-retardant layer 321 arranged in this order from the conductor 311 side. In the following description of the cover layer 320, the flame-retardant layer 321 covered by the water-blocking layer 322 and located inside is referred to as "inner flame-retardant layer 321a", and the flame-retardant layer 321 located outermost is referred to as "outer flame-retardant layer 321b".

Inner Flame-Retardant Layer

The inner flame-retardant layer 321a is formed of a resin composition containing a flame retardant and is formed by, e.g., extruding the resin composition containing a flame retardant on the outer surface of the conductor 311. The inner flame-retardant layer 321a containing a flame retardant contributes to flame retardancy of the cover layer 320. In addition, since the water-blocking layer 322 covering the inner flame-retardant layer 321a prevents water ingress when the insulated wire 301 is immersed in water for evaluation of DC stability, the inner flame-retardant layer 321a can have high insulation reliability and also contributes to DC stability of the cover layer 320. In other words, the inner flame-retardant layer 321a contributes not only flame retardancy but also DC stability, and thus functions as a flame-retardant insulation layer.

The resin composition constituting the inner flame-retardant layer 321a contains a resin and a flame retardant.

The type of the resin constituting the inner flame-retardant layer 321a is appropriately changed according to the characteristics, e.g., elongation and strength, etc., required for the insulated wire 301. It is possible to use, e.g., a polyolefin resin and a polyamide-imide resin (PAI resin), etc. The polyolefin resin used here can be a polyethylene-based resin or a polypropylene-based resin, etc., and it is particularly preferable to use the polyethylene-based resin. Examples of the polyethylene-based resin used here include low-density polyethylene (LDPE), linear low-density polyethylene (LL-DPE), high-density polyethylene (HDPE), ethylene-vinyl acetate copolymer (EVA), ethylene-ethyl acrylate copolymer, ethylene-methyl acrylate copolymer and ethylene-glycidyl methacrylate copolymer, etc. These polyolefin-based resins may be used alone or in combination of two or more. Particularly, it is preferable to use EVA, more preferably, EVA with a vinyl acetate content (VA content) of 10%-40% so that the inner flame-retardant layer 321a can have higher flame retardancy.

The flame retardant is preferably a halogen-free flame retardant since it does not produce toxic gas, and for example, a metal hydroxide can be used. The metal hydroxide is decomposed and dehydrated when the inner flame-retardant layer 321a is heated and burnt and the released water lowers the temperature of the inner flame-retardant layer 321a and suppresses combustion thereof. As the metal hydroxide, it is possible to use, e.g., magnesium hydroxide, aluminum hydroxide, calcium hydroxide and these metal hydroxides with dissolved nickel. These flame retardants may be used alone or in a combination of two or more.

The flame retardant is preferably surface-treated with, e.g., a silane coupling agent, a titanate-based coupling agent, fatty acid such as stearic acid, fatty acid salt such as stearate, or fatty acid metal such as calcium stearate to control mechanical characteristics (a balance between tensile strength and elongation) of the inner flame-retardant layer 321a.

The amount of the flame retardant to be mixed is preferably 50 parts by mass-300 parts by mass with respect to 100 parts by mass of the resin in view of flame retardancy. When the mixed amount is less than 50 parts by mass, the insulated wire 301 may not be able to have desired high flame retardancy. When the mixed amount is more than 250 parts by mass, mechanical characteristics of the inner flame-retardant layer 321a may decrease, resulting in a decrease in elongation percentage.

The inner flame-retardant layer 321a may be cross-linked by a conventionally known method. The inner flame-retardant layer 321a is preferably cross-linked by, e.g., radiation such as electron beam. The inner flame-retardant layer 321a may be formed by extruding a resin composition containing a cross-linking agent or a cross-linking aid and then cross-linked.

Water-Blocking Layer

Preferably, the water-blocking layer 322 has a water absorption of not more than 0.5% at saturation and is configured to have a small water absorption rate or a small water diffusion coefficient. The water-blocking layer 322, which has high water-blocking properties and is hard for water to penetrate, can prevent water ingress to the inner flame-retardant layer 321a located on the inner side of the cover layer 320. The water-blocking layer 322 practically does not contain a flame retardant and has poor flame retardancy, but is covered and protected by the outer flame-retardant layer 321b (described later).

A material having a water absorption of not more than 0.5% at saturation is used to form the water-blocking layer 322, and the lower limit of the water absorption at saturation is not specifically limited and may be 0%. The term "water absorption at saturation" as used herein means water saturation derived by Fick's law in accordance with JIS K 7209:2000.

The material used to form the water-blocking layer 322 is preferably a resin in view of molding processability of the water-blocking layer 322. The resin is preferably a halogen-free polyolefin resin in view of safety, and is preferably a resin having a density of 0.85 g/cm$^3$-1.20 g/cm$^3$ to obtain water-blocking properties and mechanical characteristics. It is possible to use, e.g., high-density polyethylene (HDPE), low-density polyethylene (LDPE) and linear low-density polyethylene (LLDPE), etc. Alternatively, a fluorine-containing resin (e.g., PFA), etc., may be used since the water absorption is small.

When the water-blocking layer 322 is formed of a resin such as LDPE or LLDPE, for example, a resin composition containing LLDPE is extruded on the outer surface of the inner flame-retardant layer 321a. To further improve water-blocking properties of the water-blocking layer 322, the water-blocking layer 322 is preferably formed of a cross-linked body obtained by cross-linking a resin composition containing a cross-linking agent or a cross-linking aid. The resin can have a stronger molecular structure when cross-linked and it is thereby possible to improve water-blocking properties of the water-blocking layer 322. In addition, since this also improves strength of the water-blocking layer 322, high water-blocking properties can be maintained without impairing strength even if the thickness of the water-blocking layer 322 is reduced.

The cross-linked body constituting the water-blocking layer 322 is cross-linked so as to have a gel fraction of preferably 10%-100%, more preferably 40%-100%. Since strength and water-blocking properties of the water-blocking layer 322 can be increased by increasing the gel fraction of the cross-linked body, the thickness of the water-blocking layer 322 can be reduced.

When the water-blocking layer 322 is cross-linked, it is preferable to mix a known cross-linking agent or cross-linking aid to the resin composition. As the cross-linking agent, it is possible to use, e.g., an organic peroxide such as dicumyl peroxide. As the cross-linking aid, it is possible to use, e.g., trimethylolpropane methacrylate (TMPT) and tri-allyl isocyanurate (TAIL), etc. The mixed amount thereof is not specifically limited and is appropriately changed so that, e.g., the degree of cross-linking of the water-blocking layer 322 is 10%-100% in terms of gel fraction. The cross-linking method can be a known method such as chemical cross-linking or electron beam cross-linking depending on the type of cross-linking agent.

In addition, the resin composition constituting the water-blocking layer 322 preferably contains at least one of an antioxidant and a copper inhibitor, more preferably contains both. The water-blocking layer 322 is sandwiched between the flame-retardant layers 321 and is thus less likely to be affected by oxidation or metal-induced degradation (e.g., copper-induced degradation). However, the water-blocking layer 322 is responsible for most part of DC stability of the insulated wire 301 and, if the water-blocking layer 322 deteriorates due to oxidation or metal-induced degradation (e.g., copper-induced degradation), DC stability of the insulated wire 301 is greatly impaired. Therefore, in the third embodiment, an antioxidant and a copper inhibitor are mixed to the water-blocking layer 322 and it is thereby possible to improve heat resistance of the entire cover layer 320, e.g., heat resistance at 120° C.

The antioxidant is not specifically limited, and it is possible to use, e.g., phenolic, sulfur, amine, phosphorus antioxidants, etc.

Examples of preferable phenolic antioxidants include dibutylhydroxytoluene (BHT), pentaerythritol tetrakis[3-(3,5-di-t-butyl-4-hydroxyphenyflpropionate], 1,3,5-tris(3,5-di-t-butyl-4-hydroxybenzyl)-s-triazine-2,4,6(1H,3H,5H)trione and thiodiethylene bis [3-(3,5-di-tert-butyl-4-hydroxyphenyl)propionate], etc. Of those, pentaerythritol tetrakis[3-(3,5-di-t-butyl-4-hydroxyphenyflpropionate] is preferable.

As the sulfur antioxidant, it is possible to use, e.g., didodecyl 3,3'-thiodipropionate, ditridecyl 3,3'-thiodipropionate, dioctadecyl 3,3'-thiodipropionate and tetrakis[methylene-3-(dodecylthio)propionate]methane, etc. Of those, tetrakis[methylene-3-(dodecylthio)propionate]methane is preferable.

These antioxidants may be used alone or in combination of two or more.

The copper inhibitor stabilizes ions of copper or other metals by the chelate effect and thus can suppress oxidation degradation. It is possible to use, e.g., N-(2H-1,2,4-triazol-5-yl)salicylamide, dodecanedioic acid bis[N2-(2-hydroxybenzoyl)hydrazide], 2'-,3-bis[3-[3,5-di-tert-butyl-4-hydroxyphenyl] propionyl]] propionohydrazide, etc. Of those, 2'-,3-bis[3-[3,5-di-tert-butyl-4-hydroxyphenyl] propionyl]] propionohydrazide is preferable.

The amounts of the antioxidant and the copper inhibitor to be mixed are not specifically limited, but it is preferable that 0.1 parts by mass-5 parts by mass of at least one of the antioxidant and the copper inhibitor be mixed with respect to 100 parts by mass of the resin. When the combination of the antioxidant and the copper inhibitor is used, the total mixed amount is preferably in the above-mentioned range.

Outer Flame-Retardant Layer

The outer flame-retardant layer 321b is formed of a resin composition containing a flame retardant in the same manner as the inner flame-retardant layer 321a, and is formed by, e.g., extruding the resin composition containing a flame retardant on the outer surface of the water-blocking layer 322. The outer flame-retardant layer 321b is located on the surface of the cover layer 320 and is not covered with the water-blocking layer 322 unlike the inner flame-retardant layer 321a. Therefore, the outer flame-retardant layer 321b is easy for water to penetrate and thus does not contribute to DC stability, but suppresses a decrease in flame retardancy of the entire cover layer 320 by covering the water-blocking layer 322 having poor flame retardancy.

The outer flame-retardant layer 321b may be cross-linked in the same manner as the inner flame-retardant layer 321a. To cross-link the outer flame-retardant layer 321b, for example, a cross-linking agent or a cross-linking aid is mixed to the resin composition used to form the outer flame-retardant layer 321b and the resin composition is extruded and then cross-linked. The cross-linking method is not specifically limited and a known method can be used.

Laminated Structure of Cover Layer

Next, the laminated structure of the cover layer 320 will be described.

In the cover layer 320, the thickness of the water-blocking layer 322 is not specifically limited but is preferably not less than 50 μm to ensure water-blocking properties. By having a thickness of not less than 50 μm, the water-blocking layer 322 can have desired high water-blocking properties and higher strength. Since this prevents the water-blocking layer 322 from being broken when the insulated wire 301 is bent, it is possible to maintain water-blocking properties of the water-blocking layer 322, thereby allowing the inner flame-retardant layer 321a to contribute to DC stability. Here, the upper limit of the thickness of the water-blocking layer 322 is not specifically limited, but is preferably not more than 150 μm in view of flame retardancy of the insulated wire 301.

In addition, in the cover layer 320, the respective thicknesses of the plural flame-retardant layers 321 are not specifically limited and can be appropriately changed according to flame retardancy and DC stability which are required for the cover layer 320. To obtain high flame retardancy, the total thickness of the plural flame-retardant layers 321 is preferably 300 μm-500 μm.

The thickness of the inner flame-retardant layer 321a is preferably 50 μm-150 μm.

The outer flame-retardant layer 321b, which covers the water-blocking layer 322 to retard burning of the water-blocking layer 322, preferably has a thickness of not less than 200 μm. On the other hand, the upper limit is preferably not more than 400 μm.

In addition, a ratio of the total thickness of the flame-retardant layers 321 to the thickness of the water-blocking layer 322 in the cover layer 320 is preferably 2:1-10:1.

Effects of the Third Embodiment

In the third embodiment, one or several effects described below are obtained.

In the third embodiment, the cover layer 320 is configured such that the water-blocking layer 322 having a water absorption of not more than 0.5% at saturation is interposed between the flame-retardant layers 321, i.e., the inner flame-retardant layer 321a, the water-blocking layer 322 and the outer flame-retardant layer 321b are laminated in this order from the conductor 311 side.

Since the water-blocking layer 322 can prevent water ingress to the inner flame-retardant layer 321a and allows the inner flame-retardant layer 321a to maintain insulation reliability, the inner flame-retardant layer 321a can functions as a flame-retardant insulation layer which can contribute to not only flame retardancy but also DC stability. As a result, it is possible to maintain desired DC stability without forming the insulation layer 3120 contributing DC stability which is formed in the conventional insulated wire 3100 shown in FIG. 11. In contrast to the insulation layer 3120 which needs to be formed thick to obtain desired DC stability, the water-blocking layer 322 can be thin to the extent that water-blocking properties are obtained. Thus, by forming the water-blocking layer 322 instead of the insulation layer 3120, the outer diameter of the insulated wire 301 can be reduced by the thickness difference.

Meanwhile, the water-blocking layer 322 practically does not contain a flame retardant and may decrease may cause a decrease in flame retardancy of the cover layer 320, but high flame retardancy of the cover layer 320 as a whole can be maintained by covering the water-blocking layer 322 with the outer flame-retardant layer 321b.

As such, in the third embodiment, the insulated wire 301 can have a reduced outer diameter while achieving both high flame retardancy and high DC stability.

To form the conventional insulated wire 3100 shown in FIG. 11 so as to achieve, e.g., both high flame retardancy in compliance with EN 45545-2 and high DC stability in compliance with EN 50305.6.7, the insulation layer 3120 needs to have a thickness of 0.3 mm-0.4 mm and the flame-retardant layer 3130 containing a flame retardant needs to have a thickness of 0.4 mm-0.5 mm when using the conductor 3110 with an outer diameter of 1.0 mm-6.0 mm, resulting in that the insulated wire 3100 has an outer diameter of 2.6 mm-6.7 mm.

On the other hand, in the third embodiment, the inner flame-retardant layer 321a having a thickness of 0.05 mm-0.15 mm, the water-blocking layer 322 having a thickness of 0.05 mm-0.15 mm and the outer flame-retardant layer 321b having a thickness of 0.2 mm-0.4 mm can be laminated even when the conductor 311 has the same diameter, and the outer diameter of the insulated wire 301 can be reduced to the range of 2.2 mm-5.7 mm.

For example, when the conventional insulated wire 3100 has a conductor with a cross sectional area of 1 SQ (conductor diameter of 1.25 mm), the thickness of the cover layer (cover thickness) including the insulation layer 3120 and the flame-retardant layer 3130 provided around the conductor 3110 needs to be 0.6 mm and the wire outer diameter is thus 2.6 mm. In contrast, in the third embodiment, the thickness of the cover layer including the inner flame-retardant layer 321a and the water-blocking layer 322, etc., can be reduced to about 0.45 mm-0.5 mm, and the wire outer diameter thus can be reduced to 2.2 mm-2.3 mm.

The water-blocking layer 322 is preferably formed of a resin such as HDPE, LDPE or LLDPE, and is more preferably formed of LDPE. It is because LDPE is cross-linked more easily than HDPE or LLDPE, and thus allows the water-blocking layer 322 to have a higher gel fraction and resulting higher water-blocking properties.

It is preferable that the water-blocking layer 322 be formed of a cross-linked body which is obtained by cross-linking LDPE or LLDPE and has a gel fraction of 10%-100%. When the gel fraction is in such range, strength and water-blocking properties of the water-blocking layer 322 are increased and the thickness of the water-blocking layer 322 thus can be reduced. As a result, the outer diameter of the insulated wire 301 can be further reduced.

The resin composition constituting the water-blocking layer 322 contains a resin and preferably at least one of an antioxidant and a copper inhibitor. Although the water-blocking layer 322 is sandwiched between the flame-retardant layers 321 and is thus less likely to be affected by oxidation or metal-induced degradation (e.g., copper-induced degradation), mixing the antioxidant and the copper inhibitor has an effect to improve heat resistance at, e.g., 120° C.

In the third embodiment, the insulated wire 301 may not be reduced in diameter and may have the same diameter as the conventional wires. In this case, it is possible to further increase flame retardancy and DC stability by increasing the thickness of the flame-retardant layer 321.

Other Embodiments of the Invention

Although the third embodiment of the invention has been specifically described, the invention is not limited to the above-mentioned embodiment and can be appropriately changed without departing from the gist of the invention.

Figure 10:
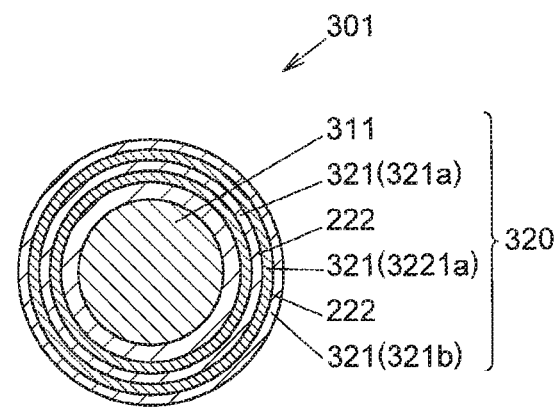
FIG. 10 is a cross sectional view showing an insulated wire in another embodiment taken perpendicular to the longitudinal direction thereof.

Although the cover layer 320 having the three-layer structure formed by sequentially laminating the flame-retardant layer 321, the water-blocking layer 322 and the other flame-retardant layer 321 on the conductor 311 has been described as an example in the third embodiment, the invention is not limited thereto. For example, plural flame-retardant layers 321 and plural water-blocking layers 322 may be provided, such as a five-layer structure in which two water-blocking layers 322 are interposed each between three flame-retardant layers 321 as shown in FIG. 10. In FIG. 10, one of the three flame-retardant layers 321 which is located on the surface of the cover layer 320 is the outer flame-retardant layer 321b, and the other flame-retardant layers 321 covered with the water-blocking layers 322 are the inner flame-retardant layers 321a. The thickness of each water-blocking layer 322 is at least 25 μm, and preferably 25 μm-75 μm. In this case, in view of flame retardancy of the cover layer 320, the total thickness of the plural water-blocking layers 322 is preferably 50 μm-150 μm. Among the plural flame-retardant layers 321, the thickness of the outer flame-retardant layer 321b is at least 50 μm, and preferably 50 μm-120 μm. The thickness of the inner flame-retardant layers 321a is preferably 50 μm-150 μm. In view of flame retardancy of the cover layer 320, the total thickness of the plural flame-retardant layers 321 is preferably 200 μm-400 μm.

Each of the resin compositions constituting the flame-retardant layer 321 and the water-blocking layer 322 may also contain other additives, if required. For example, a flame-retardant aid, an antioxidant, a lubricant, a softener, a plasticizer, an inorganic filler, a compatibilizing agent, a stabilizer, carbon black and a colorant, etc., may be contained. These additives can be contained as long as the respective characteristics of the flame-retardant layer 321 and the water-blocking layer 322 are not impaired.

In addition, although the cover layer 320 composed of the flame-retardant layers 321 and the water-blocking layer(s) 322 has been described in the third embodiment, the cover layer 320 may be provided with a resin layer which has different characteristics from the flame-retardant layer 321 or the water-blocking layer 322. For example, to improve electrical characteristics, a semiconducting layer may be provided between the conductor 311 and the inner flame-retardant layer 321a.

Examples

The invention will be described in more detail below in reference to Examples. However, the invention is not limited thereto.

The following materials were used in Examples and Comparative Examples.

Ethylene-vinyl acetate copolymer (EVA1): "Evaflex EV260", VA content: 28%, MFR: 6, manufactured by Du Pont-Mitsui Polychemical Ethylene-vinyl acetate copolymer (EVA2): "Evaflex EV170", VA content: 33%, MFR: 1, manufactured by Du Pont-Mitsui Polychemical High-density polyethylene (HDPE, d: 0.951 g/cm$^3$, MFR: 0.8): "HI-ZEX 5305E", manufactured by Prime Polymer Low-density polyethylene (LDPE, d: 0.921 g/cm$^3$, MFR: 1): "UBE C450", manufactured by Ube Industries Linear low-density polyethylene (LLDPE, d: 0.922 g/cm$^3$, MFR: 2.5): "SP2030", manufactured by Prime Polymer Maleic acid-modified polymer: "TAFMER MH7020", manufactured by Mitsui Chemicals Magnesium hydroxide (silane-treated): "H10A", manufactured by Albemarle Magnesium hydroxide (fatty acid-treated): "H10C", manufactured by Albemarle Aluminum hydroxide (fatty acid-treated): "OL107C", manufactured by Albemarle Blended antioxidant: "AO-18", manufactured by ADEKA Phenolic antioxidant: "Irganox 1010", manufactured by BASF Copper inhibitor: "Irganox MD1024", manufactured by BASF Colorant: "FT carbon", manufactured by Asahi Carbon Lubricant (Zinc stearate): manufactured by Nittoh Chemical Preparation of Flame-Retardant Material A flame-retardant material for forming flame-retardant layer was prepared by mixing the above-listed materials with the mixing proportions shown in Table 6. In detail, 85 parts by mass of EVA1, 15 parts by mass of maleic acid-modified polymer, 80 parts by mass of silane-treated magnesium hydroxide, 120 parts by mass of fatty acid-treated magnesium hydroxide, 1 part by mass of blended antioxidant, 2 parts by mass of colorant and 1 part by mass of lubricant were mixed and kneaded by a pressure kneader, and a flame-retardant material 8 in the form of pellets was thereby obtained.

Flame-retardant materials 9 to 14 were prepared in the same manner, with various mixing proportions as shown in Table 6.

Kneading by the pressure kneader was started with a temperature of 40° C. and finished with a temperature of 190° C.

TABLE 6

|  |  |  |  | Flame-retardant materials | | | | | | |
|---|---|---|---|---|---|---|---|---|---|---|
|  |  |  |  | FR 8 | FR 9 | FR 10 | FR 11 | FR 12 | FR 13 | FR 14 |
| Mixing proportions | Polymer component | EVA1 | EV260 (VA content: 28%, MFR = 6) | 85 | — | 85 | 85 | 90 | 90 | 20 |
|  |  | EVA2 | EV170 (VA content: 3%, MFR = 1) | — | 85 | — | — | — | — | 40 |
|  |  | LDPE | UBE C450 | — | — | 10 | 10 | — | — | 30 |
|  |  | Maleic acid-modified polymer | MH7020 | 15 | 15 | 5 | 10 | 10 | 10 | 10 |
|  | Flame retardant | Magnesium hydroxide (silane-treated) | H10A | 80 | 80 | 40 | 60 | 100 | 80 | 80 |
|  |  | Magnesium hydroxide (fatty acid-treated) | H10C | 120 | 120 | 60 | 90 | 150 | — | 120 |
|  |  | Aluminum hydroxide (fatty acid-treated) | OL107C | — | — | — | — | — | 120 | — |
|  | Antioxidant | Blended | AO-18 | 1 | 1 | 1 | 1 | 1 | 1 | 1 |
|  | Colorant | FT carbon |  | 2 | 2 | 2 | 2 | 2 | 2 | 2 |
|  | Lubricant | Zinc stearate |  | 1 | 1 | 1 | 1 | 1 | 1 | 1 |
|  | Total |  |  | 304 | 304 | 204 | 259 | 354 | 304 | 304 |

FR: Flame-retardant material

Preparation of Water-Blocking Material

Subsequently, water-blocking materials for forming water-blocking layer were prepared by mixing the above-listed materials with the mixing proportions shown in Table 7. In detail, a water-blocking material 3 was prepared by mixing and kneading 100 parts by mass of HDPE, 1 part by mass of phenolic antioxidant and 0.5 parts by mass of copper inhibitor using a pressure kneader.

Water-blocking materials 4 to 6 were prepared in the same manner, with various mixing proportions as shown in Table 7.

Kneading by the pressure kneader was started with a temperature of 40° C. and finished with a temperature of 190° C.

TABLE 7

|  |  |  |  | Water-blocking materials | | | |
|---|---|---|---|---|---|---|---|
|  |  |  |  | WB 3 | WB 4 | WB 5 | WB 6 |
| Mixing proportions | Polymer component | HDPE | HI-ZEX 5305E (MFR: 0.8, d = 0.951) | 100 | — | — | 50 |
|  |  | LDPE | UBE C450 (MFR: 1, d = 0.921) | — | 100 | — | 50 |
|  |  | LLDPE | SP2030 (MFR: 2.5, d = 0.922) | — | — | 100 | — |

TABLE 7-continued

|  |  |  | Water-blocking materials | | | |
|---|---|---|---|---|---|---|
|  |  |  | WB 3 | WB 4 | WB 5 | WB 6 |
| Antioxidant | Phenolic | Irganox 1010 | 1 | 1 | 1 | 1 |
| Copper inhibitor |  | Irganox MD1024 | 0.5 | 0.5 | 0.5 | 0.5 |
| Total |  |  | 101.5 | 101.5 | 101.5 | 101.5 |

WB: water-blocking material

Manufacturing of Insulated Wire

Example 14

Subsequently, an insulated wire was made using the prepared flame-retardant material and water-blocking material.

In detail, three layers of the flame-retardant material 8, the water-blocking material 3 and the flame-retardant material 8 having the respective predetermined thicknesses were co-extruded around a tin-plated copper conductor having an outer diameter of 1.25 mm, and were cross-linked by exposure to an electron beam at 8 Mrad, thereby obtaining an insulated wire in Example 14. The obtained insulated wire had a 50 μm-thick inner flame-retardant layer, a 50 μm-thick water-blocking layer and a 400 μm-thick outer flame-retardant layer, the thickness of the entire cover layer was 500 μm, and the wire outer diameter was 2.25 mm. The water-blocking layer had such a degree of cross-linking that the gel fraction was 36%, and the water absorption at saturation was 0.3%. For the three-layer co-extrusion, flows from three short-screw extruders are combined in a crosshead. The temperature of the crosshead was 190° C.

TABLE 8

|  |  |  |  | Examples | | | | | | |
|---|---|---|---|---|---|---|---|---|---|---|
|  |  |  |  | 14 | 15 | 16 | 17 | 18 | 19 | 20 |
| Insulated wire | Wire outer diameter [mm] |  |  | 2.25 | 2.15 | 2.15 | 2.25 | 2.15 | 2.25 | 2.25 |
|  | Conductor | Conductor diameter [mm] |  | 1.25 | 1.25 | 1.25 | 1.25 | 1.25 | 1.25 | 1.25 |
|  | Cover layer | Inner flame-retardant layer | Material | FR 8 | FR 9 | FR 10 | FR 11 | FR 12 | FR 13 | FR 14 |
|  |  |  | Thickness [μm] | 50 | 150 | 50 | 100 | 150 | 100 | 100 |

TABLE 8-continued

| | | | | | | | | | |
|---|---|---|---|---|---|---|---|---|---|
| | Water-blocking layer | Material | WB 3 | WB 3 | WB 3 | WB 3 | WB 3 | WB 3 | WB 3 |
| | | Thickness [μm] | 50 | 100 | 150 | 110 | 100 | 110 | 110 |
| | | Water absorption at saturation [%] | 0.3 | 0.2 | 0.1 | 0.2 | 0.2 | 0.2 | 0.2 |
| | | Gel fraction [%] | 36 | 33 | 33 | 32 | 31 | 35 | 33 |
| | Outer flame-retardant layer | Material | FR 8 | FR 9 | FR 10 | FR 11 | FR 12 | FR 13 | FR 14 |
| | | Thickness [μm] | 400 | 200 | 300 | 290 | 200 | 290 | 290 |
| | Thickness of cover layer [μm] | | 500 | 450 | 500 | 500 | 450 | 500 | 500 |
| Evaluation | DC stability | Time to short-circuit [h] | 250 | 310 | 500 | 420 | 370 | 410 | 430 |
| | | | (○) | (○) | (○) | (○) | (○) | (○) | (○) |
| | Flame retardancy | | X | ○ | ○ | ○ | ○ | ○ | ○ |
| | Heat resistance | Tensile strength retention [%] | +20 | +13 | +10 | +11 | +27 | +22 | +20 |
| | | | ○ | ○ | ○ | ○ | ○ | ○ | ○ |
| | | Elongation retention [%] | −12 | −6 | −5 | −6 | −20 | −15 | −10 |
| | | | ○ | ○ | ○ | ○ | ○ | ○ | ○ |

| | | | | Examples | | | Comparative Examples | |
|---|---|---|---|---|---|---|---|---|
| | | | | 21 | 22 | 23 | 19 | 20 |
| Insulated wire | Wire outer diameter [mm] | | | 2.25 | 2.25 | 2.25 | 1.65 | 2.05 |
| | Conductor | Conductor diameter [mm] | | 1.25 | 1.25 | 1.25 | 1.25 | 1.25 |
| | Cover layer | Inner flame-retardant layer | Material | FR 8 | FR 8 | FR 8 | FR 8 | FR 8 |
| | | | Thickness [μm] | 100 | 100 | 100 | 100 | 100 |
| | | Water-blocking layer | Material | WB 4 | WB 5 | WB 6 | WB 3 | — |
| | | | Thickness [μm] | 110 | 110 | 110 | 100 | |
| | | | Water absorption at saturation [%] | 0.2 | 0.2 | 0.2 | 0.2 | |
| | | | Gel fraction [%] | 48 | 41 | 45 | 31 | |
| | | Outer flame-retardant layer | Material | FR 8 | FR 8 | FR 8 | — | FR 8 |
| | | | Thickness [μm] | 290 | 290 | 290 | | 300 |
| | Thickness of cover layer [μm] | | | 500 | 500 | 500 | 200 | 400 |
| Evaluation | DC stability | Time to short-circuit [h] | | 400 | 450 | 400 | 250 | 24 |
| | | | | (○) | (○) | (○) | (○) | (X) |
| | Flame retardancy | | | ○ | ○ | ○ | X | ○ |
| | Heat resistance | Tensile strength retention [%] | | +9 | +8 | +12 | +25 | +33 |
| | | | | ○ | ○ | ○ | ○ | X |
| | | Elongation retention [%] | | −5 | −5 | −8 | −16 | −28 |
| | | | | ○ | ○ | ○ | ○ | ○ |

FR: flame retardant material,
WB: water-blocking material

Examples 14 to 23

Insulated wires in Examples 15 to 23 were made in the same manner as Example 14, except that the types of flame-retardant material and water-blocking material, and the thicknesses of the inner flame-retardant layer, the water-blocking layer and the outer flame-retardant layer were appropriately changed as shown in Table 8.

Comparative Examples 19 and 20

An insulated wire in Comparative Example 19 was made in the same manner as Example 14, except that the cover layer was formed by providing the water-blocking layer on the inner flame-retardant layer without forming the outer flame-retardant layer, as shown in Table 8.

An insulated wire in Comparative Example 20 was made in the same manner as Example 14, except that the cover layer was formed of one flame-retardant layer without forming the water-blocking layer, as shown in Table 8.

Evaluation Method

The obtained insulated wires were evaluated by the following methods. The evaluation results are summarized in Table 8.

DC Stability

DC stability of the insulated wires was evaluated by conducting the DC stability test in accordance with EN 50305.6.7. In detail, voltage of 1500V was applied to the insulated wires immersed in 3% salt water at 85° C., and time to insulation breakdown was measured. In these Examples, DC stability was evaluated as high (○) when time to insulation breakdown was not less than 240 hours, and evaluated as low (×) when less than 240 hours.

Flame Retardancy

Flame retardancy of the insulated wires was evaluated by conducting a vertical flame test in accordance with EN 45545-2.

In detail, a flame was applied to vertically-held insulated wires by a burner for 1 minute. The wires were evaluated as having excellent flame retardancy (○) when a distance between the top support and the upper edge of the charred portion after removing the flame was not less than 50 mm and a distance between the top support and the lower edge of the charred portion was less than 540 mm. Others were evaluated as not having enough flame retardancy (×).

Heat Resistance

Heat resistance of the insulated wires was evaluated by conducting a test in accordance with EN 50264-1.

In detail, firstly, the conductor (tin-plated copper conductor) was pulled out of each of the obtained insulated wires to make samples. The samples were placed in a constant-temperature oven at 135° C. for 168 hours. The tensile test was conducted on the samples before heating (the initial state) and after heating. Then, tensile strength retention and elongation retention were calculated and obtained as variation from the initial state. In these Examples, the samples were evaluated as having excellent heat resistance (○) when both tensile strength retention and elongation retention were within ±30%. Others were evaluated as having low heat resistance (×).

Evaluation Results

In Examples 14 to 23, both DC stability and flame retardancy were achieved at high levels while reducing the wire outer diameters, as shown in Table 8.

In Example 16, the water-blocking layer was formed to have a low water absorption of 0.1% at saturation and the amount of flame retardant mixed to the flame-retardant layer was 100 parts by mass which was less than Example 14 (200 parts by mass) and Example 17 (150 parts by mass) so that the cover layer did not absorb water easily. Therefore, time to short-circuit was long and DC stability was high.

On the other hand, in Comparative Example 19, high DC stability was obtained but flame retardancy of the entire cover layer was not sufficient since the outer flame-retardant layer was not formed.

Meanwhile, in Comparative Example 20, high flame retardancy was obtained since the cover layer was formed of only the flame-retardant layer without providing the water-blocking layer, but time to short-circuit was short and DC stability was not sufficient. In addition, since the water-blocking layer containing an antioxidant and a copper inhibitor was not formed, heat resistance of the entire cover layer was not sufficient.

Preferred Embodiments of the Invention

Preferred embodiments of the invention will be described below.

[21] An aspect of the invention provides an insulated wire comprising:
a conductor; and
a cover layer arranged around the conductor,
wherein the cover layer is formed by alternately laminating, from the conductor side, flame-retardant layers comprising a resin composition containing a flame retardant and a water-blocking layer(s) so that one of the flame-retardant layers is located outermost, and the water-blocking layer comprises a resin composition comprising a resin and at least one of an antioxidant and a copper inhibitor.

[22] In the insulated wire defined by [21], preferably, the resin composition constituting the water-blocking layer contains not less than 0.1 parts by mass and not more than 2 parts by mass of at least one of the antioxidant and the copper inhibitor with respect to 100 parts by mass of the resin.

[23] In the insulated wire defined by [22], preferably, the water-blocking layer comprises a cross-linked body obtained by cross-linking a resin composition, and the cross-linked body has a gel fraction of not less than 40% and not more than 100%.

[24] In the insulated wire defined by any one of [21] to [23], preferably, the resin constituting the water-blocking layer is low-density polyethylene.

[25] In the insulated wire defined by any one of [21] to [24], preferably, the cover layer is formed by laminating three layers such that the flame-retardant layer, the water-blocking layer and the other flame-retardant layer are arranged in this order from the conductor side, the flame-retardant layer located on the inner side of the water-blocking layer has a thickness of not less than 50 μm and not more than 150 μm, the water-blocking layer has a thickness of not less than 50 μm and not more than 150 μm, and the flame-retardant layer located on the outer side of the water-blocking layer has a thickness of not less than 200 μm and not more than 400 μm.

The invention claimed is:

1. An insulated wire, comprising:
a conductor;
a flame-retardant insulation layer that comprises a resin composition including a flame retardant and is arranged around the conductor;
a water-blocking layer that is arranged directly on the flame-retardant insulation layer; and
a flame-retardant layer that comprises a resin composition including a flame retardant and is arranged directly on the water-blocking layer,
wherein each of the resin composition of the flame-retardant insulation layer and the resin composition of the flame-retardant layer comprises polyolefin, and the water-blocking layer has a water absorption of not more than 0.5% at saturation,
wherein an outer diameter of the conductor is not less than 1.0 mm and not more than 20.0 mm,
wherein a thickness of the water-blocking layer is not less than 25 μm and not more than 150 μm,
wherein a total thickness of the flame-retardant insulation layer and the flame retardant layer is not less than 300 μm and not more than 500 μm,
wherein the resin composition of the flame-retardant layer comprises not less than 150 parts by mass and not more than 250 parts by mass of the flame retardant with respect to 100 parts by mass of a resin,
wherein the water-blocking layer does not contain the flame retardant, and
wherein a ratio of the thickness of the water-blocking layer to a combined thickness of the water-blocking layer and the flame-retardant insulation layer is not more than 18%.

2. The insulated wire according to claim 1, wherein the water-blocking layer comprises at least one of a resin, a metal, a ceramic, and glass.

3. The insulated wire according to claim 1, wherein the water-blocking layer comprises a cross-linked body obtained by cross-linking a resin composition comprising a resin, and the cross-linked body has a gel fraction of not less than 40% and not more than 100%.

4. The insulated wire according to claim 3, wherein the resin in the resin composition of the water-blocking layer comprises at least one of high-density polyethylene and low-density polyethylene.

5. The insulated wire according to claim 3, wherein the resin in the resin composition of the water-blocking layer has a density of not less than 0.85 g/cm$^3$ and not more than 1.20 g/cm$^3$.

6. The insulated wire according to claim 1, wherein the flame-retardant insulation layer has an oxygen index of more than 45 as specified by TIS K 7201-2.

7. The insulated wire according to claim 1, wherein the water-blocking layer is interposed between the flame-retardant layer and the flame-retardant insulation layer, and the flame-retardant layer is formed as an outermost layer.

8. The insulated wire according to claim 1, wherein the resin composition of the flame-retardant layer farther comprises at least one resin selected from high-density polyethylene, linear low-density polyethylene, low-density polyethylene, ethylene-α-olefin copolymer, ethylene-vinyl acetate copolymer, ethylene-acrylic ester copolymer, and ethylene-propylene-diene copolymer.

9. The insulated wire according to claim 1, wherein the flame retardant of the flame-retardant insulation layer comprises a metal hydroxide.

10. The insulated wire according to claim 1, wherein the water-blocking layer comprises a resin composition comprising a resin and at least one of an antioxidant and a copper inhibitor.

11. The insulated wire according to claim 1, wherein a resin composition constituting the water-blocking layer comprises not less than 0.1 parts by mass and not more than 2 parts by mass of at least one of an antioxidant and a copper inhibitor with respect to 100 parts by mass of the resin.

12. The insulated wire according to claim 1, wherein the flame-retardant insulation layer located on an inner side of the water-blocking layer has a thickness of not less than 50 μm and not more than 150 μm, the water-blocking layer has a thickness of not less than 50 μm and not more than 150 μm, and the flame-retardant layer located on an outer side of the water-blocking layer has a thickness of not less than 200 μm and not more than 400 μm.

13. The insulated wire according to claim 1, wherein said each of the resin composition of the flame-retardant insulation layer and the resin composition of the flame-retardant layer comprises the polyolefin as a base polymer.

14. The insulated wire according to claim 1, wherein the polyolefin comprises one of a polyethylene-based resin and a polypropylene-based resin.

15. The insulated wire according to claim 1, wherein the polyolefin comprises a polyethylene-based resin.

16. The insulated wire according to claim 15, wherein the polyethylene-based resin comprises at least one of a low-density polyethylene (LDPE), a linear low-density polyethylene (LLDPE), a high-density polyethylene (HDPE), an ethylene-vinyl acetate copolymer (EVA), an ethylene-ethyl acrylate copolymer, an ethylene-methyl acrylate copolymer, and an ethylene-glycidyl methacrylate copolymer.

17. The insulated wire according to claim 1, wherein the wat blocking layer comprises a linear low-density polyethylene (LLDPE).

18. The insulated wire according to claim 1, wherein the water-blocking layer completely encircles the flame-retardant insulation layer,
   wherein the flame-retardant layer completely encircles the water-blocking layer, and
   wherein the ratio of the thickness of the water-blocking layer to the combined thickness of the water-blocking layer and the flame-retardant insulation layer is in a range from 5% to 12%.

19. The insulated wire according to claim 1, wherein the flame-retardant insulation layer is disposed directly on the conductor.

* * * * *